(12) United States Patent
Walker et al.

(10) Patent No.: US 12,214,546 B2
(45) Date of Patent: Feb. 4, 2025

(54) RAPID, LARGE VOLUME, DEAD LAYER-FREE 3D PRINTING

(71) Applicant: NORTHWESTERN UNIVERSITY, Evanston, IL (US)

(72) Inventors: David A. Walker, Evanston, IL (US); James L. Hedrick, III, Evanston, IL (US); Chad A. Mirkin, Wilmette, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 530 days.

(21) Appl. No.: 17/436,754

(22) PCT Filed: Mar. 9, 2020

(86) PCT No.: PCT/US2020/021729
§ 371 (c)(1),
(2) Date: Sep. 7, 2021

(87) PCT Pub. No.: WO2020/185692
PCT Pub. Date: Sep. 17, 2020

(65) Prior Publication Data
US 2022/0193988 A1  Jun. 23, 2022

Related U.S. Application Data

(60) Provisional application No. 62/948,577, filed on Dec. 16, 2019, provisional application No. 62/913,712, (Continued)

(51) Int. Cl.
*B29C 64/129* (2017.01)
*B29C 64/307* (2017.01)
(Continued)

(52) U.S. Cl.
CPC .......... *B29C 64/129* (2017.08); *B29C 64/307* (2017.08); *B29C 64/357* (2017.08); (Continued)

(58) Field of Classification Search
CPC ... B29C 64/129; B29C 64/307; B29C 64/364; B29C 64/357; B33Y 10/00; B33Y 40/00 (Continued)

(56) References Cited

U.S. PATENT DOCUMENTS

| 4,337,130 A | 6/1982 | Ahramjian |
| 4,765,818 A | 8/1988 | Che et al. |

(Continued)

FOREIGN PATENT DOCUMENTS

| CN | 105122136 A | 12/2015 |
| CN | 205033603 U | 2/2016 |

(Continued)

OTHER PUBLICATIONS

Chen et al., Tip-Directed Synthesis of Multimetallic Nanoparticles, J. Am. Chem. Soc., 137:9167-9173 (2015).

(Continued)

*Primary Examiner* — Jeffrey M Wollschlager
*Assistant Examiner* — Xue H Liu
(74) *Attorney, Agent, or Firm* — MARSHALL, GERSTEIN & BORUN LLP

(57) ABSTRACT

Methods and apparatus comprising a dewetting material and a polymerization liquid that are immiscible and dewetting, and can be used for the formation of three-dimensional objects, wherein the method does not require a dead zone. Additionally, methods and apparatus that employ the use of a flowing dewetting material to provide a shearing interface to reduce interfacial adhesive forces.

18 Claims, 13 Drawing Sheets

Related U.S. Application Data filed on Oct. 10, 2019, provisional application No. 62/815,175, filed on Mar. 7, 2019.

(51) Int. Cl.

| | |
|---|---|
| *B29C 64/357* | (2017.01) |
| *B29C 64/364* | (2017.01) |
| *B33Y 10/00* | (2015.01) |
| *B33Y 30/00* | (2015.01) |
| *B33Y 40/00* | (2020.01) |

(52) U.S. Cl.
CPC ........... *B29C 64/364* (2017.08); *B33Y 10/00* (2014.12); *B33Y 30/00* (2014.12); *B33Y 40/00* (2014.12)

(58) Field of Classification Search
USPC ........................................................ 264/401
See application file for complete search history.

(56) References Cited

U.S. PATENT DOCUMENTS

| | | |
|---|---|---|
| 5,017,461 A | 5/1991 | Abe |
| 5,122,441 A | 6/1992 | Lawton et al. |
| 5,192,559 A | 3/1993 | Hull et al. |
| 5,236,637 A | 8/1993 | Hull |
| 5,248,456 A | 9/1993 | Evans, Jr. et al. |
| 5,326,637 A | 7/1994 | Nasu et al. |
| 5,374,500 A | 12/1994 | Carpenter, Jr. et al. |
| 5,481,356 A | 1/1996 | Pouet et al. |
| 5,691,541 A | 11/1997 | Ceglio et al. |
| 5,776,748 A | 7/1998 | Singhvi et al. |
| 5,836,313 A | 11/1998 | Perez et al. |
| 6,238,852 B1 | 5/2001 | Klosner |
| 6,248,509 B1 | 6/2001 | Sanford |
| 6,312,134 B1 | 11/2001 | Jain et al. |
| 6,500,549 B1 | 12/2002 | Deppisch et al. |
| 6,596,346 B2 | 7/2003 | Bernard et al. |
| 6,602,975 B2 | 8/2003 | Hubbell et al. |
| 6,692,891 B2 | 2/2004 | Jung et al. |
| 6,932,930 B2 | 8/2005 | DeSimone et al. |
| 6,939,940 B2 | 9/2005 | Dingemans et al. |
| 7,108,947 B2 | 9/2006 | Wu et al. |
| 7,368,514 B2 | 5/2008 | Lee et al. |
| 7,438,846 B2 | 10/2008 | John |
| 7,507,784 B2 | 3/2009 | Dingemans et al. |
| 7,534,844 B2 | 5/2009 | Lee et al. |
| 7,550,246 B2 | 6/2009 | Fukuzumi et al. |
| 7,556,490 B2 | 7/2009 | Wicker et al. |
| 7,649,029 B2 | 1/2010 | Kolb et al. |
| 7,651,682 B2 | 1/2010 | Devore et al. |
| 7,651,683 B2 | 1/2010 | Devore et al. |
| 7,709,597 B2 | 5/2010 | Tamura |
| 7,767,728 B2 | 8/2010 | Lu et al. |
| 7,824,839 B2 | 11/2010 | Ober et al. |
| 7,902,526 B2 | 3/2011 | Kim et al. |
| 7,919,162 B2 | 4/2011 | DeSimone et al. |
| 7,935,476 B2 | 5/2011 | Teng |
| 8,119,214 B2 | 2/2012 | Schwantes et al. |
| 8,147,918 B2 | 4/2012 | Standke et al. |
| 8,232,043 B2 | 7/2012 | Williamson et al. |
| 8,242,299 B2 | 8/2012 | Shelekhov |
| 9,121,307 B2 | 9/2015 | Aizenberg et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 10,118,377 B2 | 11/2018 | Castanon |
| 10,232,552 B2 | 3/2019 | Baltaji et al. |
| 10,259,171 B2 | 4/2019 | Robeson et al. |
| 10,328,634 B2 | 6/2019 | Zitelli et al. |
| 10,357,919 B2 | 7/2019 | Tringali et al. |
| 10,836,104 B2 | 11/2020 | Zitelli et al. |
| 2005/0003189 A1 | 1/2005 | Bredt et al. |
| 2007/0063389 A1 | 3/2007 | John |
| 2008/0134940 A1 | 6/2008 | Wheeler |
| 2009/0148813 A1 | 6/2009 | Sun et al. |
| 2010/0310698 A1 | 12/2010 | Klare et al. |
| 2011/0190923 A1 | 8/2011 | Matsui et al. |
| 2013/0292862 A1 | 11/2013 | Joyce |
| 2013/0295212 A1 | 11/2013 | Chen et al. |
| 2015/0138723 A1 | 5/2015 | Shedd et al. |
| 2015/0233567 A1 | 8/2015 | Karam |
| 2016/0059484 A1 | 3/2016 | DeSimone et al. |
| 2016/0198576 A1 | 7/2016 | Lewis et al. |
| 2016/0221267 A1 | 8/2016 | John et al. |
| 2016/0303793 A1 | 10/2016 | Ermoshkin et al. |
| 2017/0028618 A1 | 2/2017 | Robeson et al. |
| 2017/0129167 A1 | 5/2017 | Castanon |
| 2019/0047213 A1 | 2/2019 | Stadlmann |
| 2019/0111622 A1 | 4/2019 | Khalip |
| 2019/0143584 A1 | 5/2019 | Hanrath et al. |

FOREIGN PATENT DOCUMENTS

| | | |
|---|---|---|
| CN | 105109048 B | 9/2017 |
| CN | 109311226 A | 2/2019 |
| JP | S62288844 A | 12/1987 |
| JP | H04135827 A | 5/1992 |
| JP | 2948893 B2 | 9/1999 |
| JP | 2005-047096 A | 2/2005 |
| WO | WO-93/20993 A1 | 10/1993 |
| WO | WO-2009/132321 A1 | 10/2009 |
| WO | WO-2012129968 A1 | 10/2012 |
| WO | WO-2014/012080 A1 | 1/2014 |
| WO | WO-2014/126830 A2 | 8/2014 |
| WO | WO-2014/126837 A2 | 8/2014 |
| WO | WO-2015/105762 A1 | 7/2015 |
| WO | WO-2015/119943 A1 | 8/2015 |
| WO | WO-2015/164234 A1 | 10/2015 |
| WO | WO-2015/195920 A1 | 12/2015 |
| WO | WO-2017/161398 A1 | 9/2017 |
| WO | WO-2017/210298 A1 | 12/2017 |
| WO | WO-2018/143904 A1 | 8/2018 |

OTHER PUBLICATIONS

Donzel et al., Hydrophilic Poly(dimethylsiloxane) Stamps for Microcontact Printing, Adv. Mater., 13(15):1164-7 (2001).

Favre et al., Tailorable Thermomechanical Properties Through Reactive Blending and Layer-by-Layer Deposition of Poly(1,3,5-hexahydro-1,3,5-triazine) (PHT) Networks, Advanced Functional Materials, 26(30) (May 2016).

He et al., Preparation of Hydrophilic Poly(dimethylsiloxane) Stamps by Plasma-Induced Grafting, Langmuir, 19(17):6982-6 (2003).

Hedrick et al., Hard Transparent Arrays for Polymer Pen Lithography, ACS Nano, 10:3144-8 (2016).

Huo et al., Beam pen lithography, Nat. Nanotechnol., 5(9):637-40 (2010).

International Application No. PCT/US20/21729, International Search Report and Written Opinion, mailed Oct. 14, 2020.

Kim et al., Hierarchical or not? Effect of the length scale and hierarchy of the surface roughness on omniphobicity of lubricant-infused substrates, Nano Letters, 13:1793-9 (2013).

Kuang et al. High-Speed 3D Printing of High-Performance Thermosetting Polymers via Two-Stage Curing, Macromol. Rapid Commun., 39(7):1700809 (2018).

Leslie et al., A bioinspired omniphobic surface coating on medical devices prevents thrombosis and biofouling, Nat. Biotechnol., 32(11):1134-40 (2014).

Martin et al., Direct protein microarray fabrication using a hydrogel "stamper", Langmuir, 14(15):3971-5 (1998).

Pan et al., A fast mask projection stereolithography process for fabricating digital models in minutes, J. Manufacturing Sci. and Eng. 134, 051011-1-051011-9 (Oct. 2012).

Photoacid Generator Selection Guide for the Electronics Industry and Energy Curable Coatings, BASF (2010).

Photoinitiators for UV Curing, Formulators' Guide for Coatings, Ciba Specialty Chemicals, Inc. (2003).

(56) References Cited

OTHER PUBLICATIONS

Schmid et al., Siloxane Polymers for High-Resolution, High-Accuracy Soft Lithography, 33(8):3042-9 (2000).
Tumbleston et al., Additive manufacturing. Continuous liquid interface production of 3D objects, Science, 347(6228):1349-52 (2015).
Walker et al., Rapid, large-volume, thermally controlled 3D printing using a mobile liquid interface, Science, 366(6463):360-364 (Oct. 2019).
Wu et al., Apertureless beam pen lithography based on fully metal-coated polyurethane-acrylate (PUA) pyramidal microstructure array, Opt. Express, 22(9):10593-604 (2014).
Xie et al., On-Tip Photo-Modulated Molecular Printing, Angew Chem Int Ed., 54(44):12894-9 (2015).

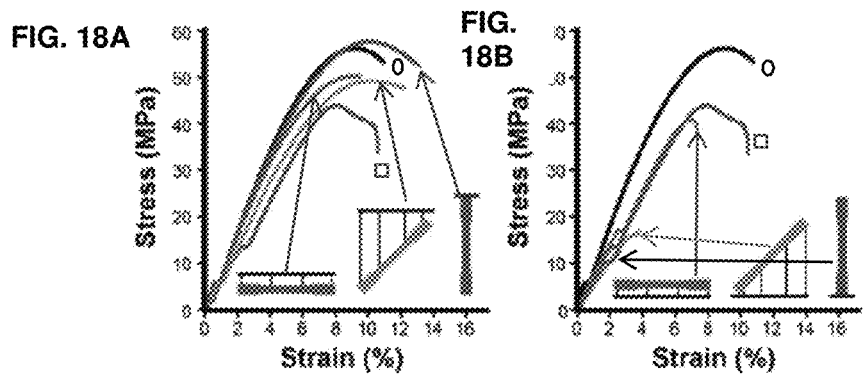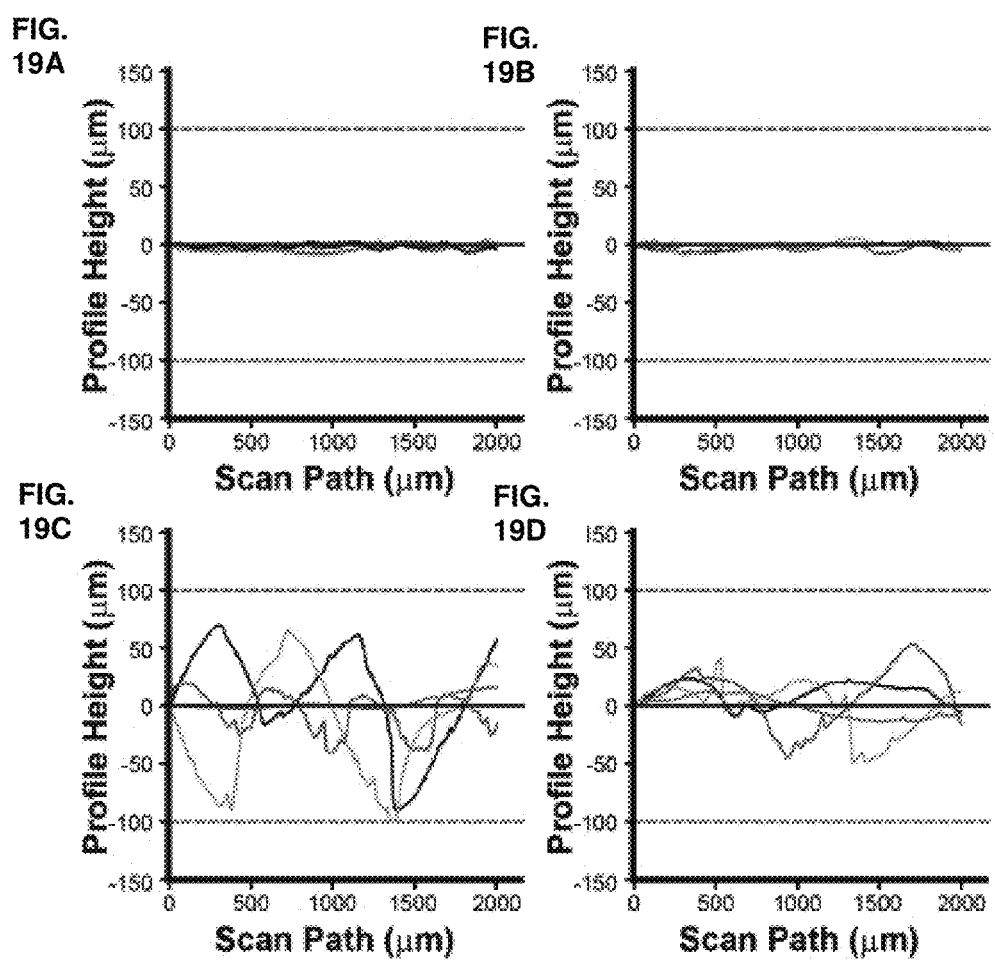

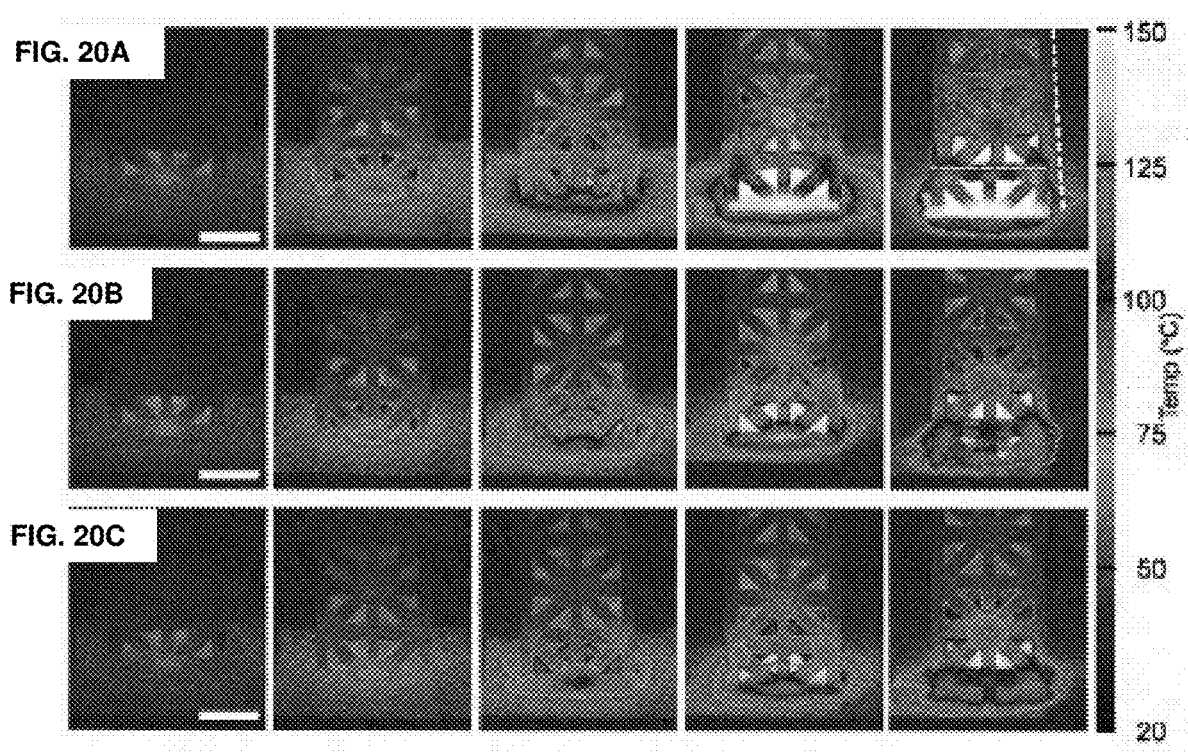

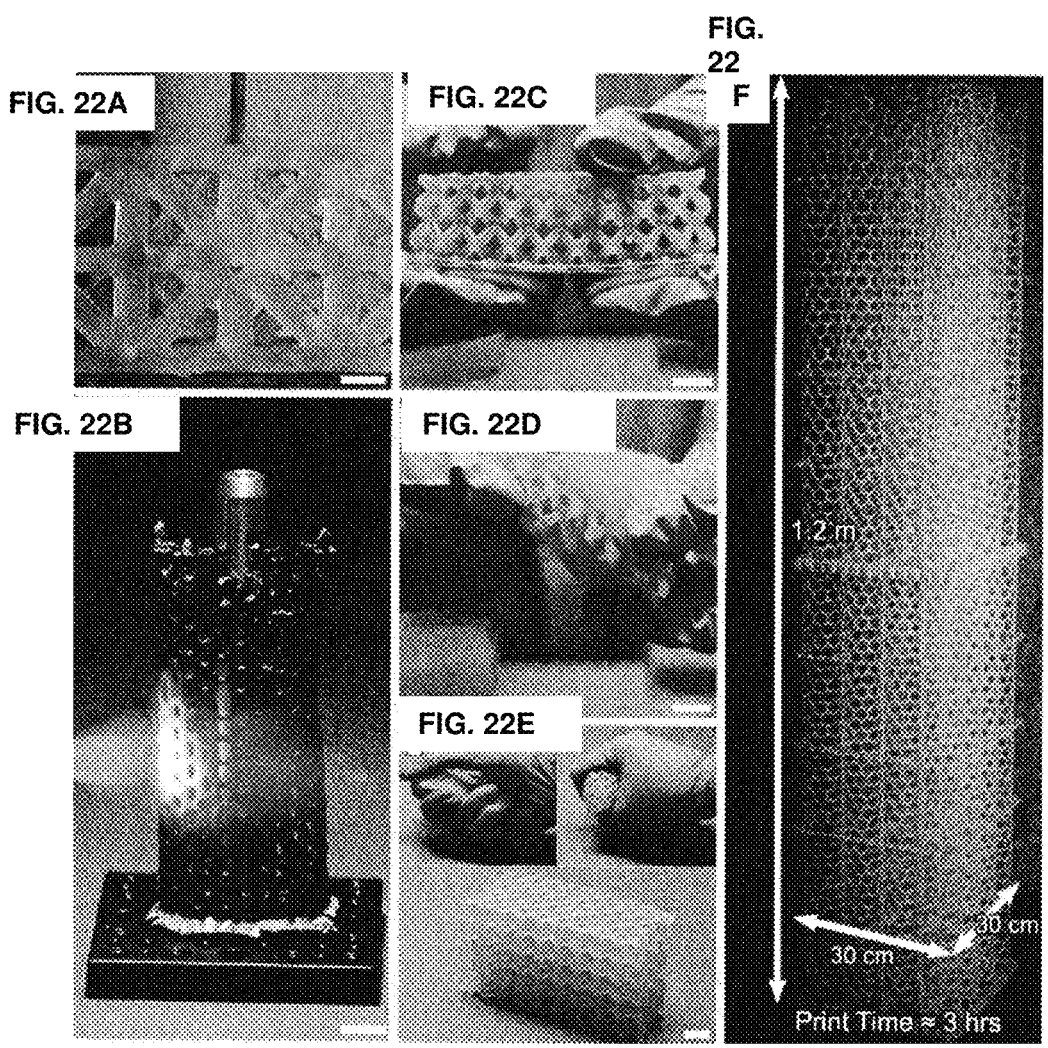

RAPID, LARGE VOLUME, DEAD LAYER-FREE 3D PRINTING

CROSS-REFERENCE TO RELATED APPLICATIONS

This application is the U.S. national stage application of PCT Application No. PCT/US20/21729 filed Mar. 9, 2020, which claims the benefit under 35 U.S.C. § 119 (e) of U.S. Provisional Patent Application Ser. No 62/815,175, filed Mar. 7, 2019, 62/913,712, filed Oct. 10, 2019, and 62/948,557, filed Dec. 16, 2019, the entire disclosures of which are incorporated herein by reference.

STATEMENT OF GOVERNMENT SUPPORT

This invention was made with government support under FA9550-16-1-0150 awarded by the Air Force Office of Scientific Research. This invention was made with government support under DE-SC0000989 awarded by the Center for Bio-Inspired Energy Science, an Energy Frontier Research Center funded by the U.S. Department of Energy, Office of Science, Basic Energy Sciences. The government has certain rights in the invention.

FIELD OF THE INVENTION

The disclosure relates generally to methods and apparatus for the fabrication of three-dimensional objects. More particularly, the disclosure relates to methods and apparatus for the fabrication of solid three-dimensional objects in a bottom-up fashion from a polymerization liquid without the need of a dead zone or inhibition layer and having a mobile dewetting phase to reduce interfacial adhesive forces.

BACKGROUND

In conventional additive or three-dimensional fabrication techniques, construction of a three-dimensional object is performed in a step-wise or layer-by-layer manner. In particular, layer formation is performed through solidification of photo curable resin under the action of visible or UV light irradiation. Two techniques are known: one in which new layers are formed at the top surface of the growing object; the other in which new layers are formed at the bottom surface of the growing object.

If new layers are formed at the top surface of the growing object, then after each irradiation step the object under construction is lowered into the resin "pool," a new layer of resin is coated on top, and a new irradiation step takes place. An early example of such a technique is given in Hull, U.S. Pat. No. 5,236,637, at FIG. 3. A disadvantage of such "top down" techniques is the need to submerge the growing object in a (potentially deep) pool of liquid resin and reconstitute a precise overlayer of liquid resin.

If new layers are formed at the bottom of the growing object, then after each irradiation step the object under construction must be separated from the bottom plate in the fabrication well. An early example of such a technique is given in Hull, U.S. Pat. No. 5,236,637, at FIG. 4, where the polymerization liquid is floated on top of a non-wetting immiscible liquid layer. Such techniques have not, however, been commercialized and dramatically different techniques for "bottom up" fabrication have been implemented instead. For example, in U.S. Pat. No. 7,438,846, an elastic separation layer is used to achieve "non-destructive" separation of solidified material at the bottom construction plane. Other approaches, such as the B9Creator™ 3-dimensional printer marketed by B9Creations of Deadwood, South. Dakota, USA, employ a sliding build plate to induce mechanical cleavage after a layer has been solidified. See, e.g., M. Joyce, US Patent App. 2013/0292862 and Y. Chen et al., US Patent App. 2013/0295212 (both Nov. 7, 2013); see also Y. Pan et al., *J. Manufacturing Sci. and Eng.* 134, 051011-1 (October 2012). Such approaches introduce a mechanical step that may complicate the apparatus, slow the method, and/or potentially distort the end product.

As described in U.S. Pat. No. 10,259,171, a "bottom-up" fabrication approach introduced by Carbon, Inc., called continuous liquid interface printing (CLIP), utilizes oxygen inhibition to create a reaction "dead zone" or "inhibition layer". This "dead zone" prevents adhesion between the emerging part and the bottom of the print pool, removing the need to repeatedly mechanically cleave the part from the pool. Rather, polymerization is chemically quenched near a build interface between an immiscible liquid and the polymerizable liquid. The "dead zone" is created by allowing a polymerization inhibitor, such as oxygen, to pass partly or fully through a semipermeable membrane to continuously feed inhibitor to the "dead zone." By preventing polymerization at the interface, adhesion is avoided and the solidified material can be continuously pulled away from the build region. The CLIP method further requires the immiscible liquid to be wettable with the polymerizable liquid, to promote spreading of the polymerizable liquid on the surface of the immiscible liquid. However, this system has several limitations. In particular, the "dead zone" is highly temperature sensitive and minor fluctuations can cause the print to fail. Additionally, the polymerization reaction is extremely exothermic and the heat must be dissipated without disruption of the "dead zone." However, cooling configurations which are effective at dissipating excess heat over large areas—those which provide active cooling mechanisms—also inhibit oxygen permeation and the creation of the "dead zone." As a result, the area of the build domain (i.e., the planar width and height) is limited to cooling configurations which do not infringe upon oxygen delivery to the "dead zone." For this reason, commercial systems that utilize CLIP rely on small print beds or slower vertical print speeds so that structures can be printed without generating temperatures that result in part degradation. Finally, the polymerization liquids that can be used are limited to those that are oxygen sensitive and allow inhibition of the polymerization by oxygen at the dead zone.

Accordingly, there is a need for alternate methods and apparatus for three-dimensional fabrication that can obviate the need for mechanical separation steps in "bottom-up" fabrication, allow for printing on large print beds, and can print quickly without generating temperatures that result in part degradation.

SUMMARY

One aspect of the disclosure provides methods of forming a three-dimensional object using an apparatus having a movable adhesion stage separate from a member, the method including: flowing a dewetting material across the member, the dewetting material having a build surface; providing a polymerization liquid on the dewetting material, wherein the polymerization liquid is immiscible with the dewetting material such that an interface is defined between the polymerization liquid and the dewetting material and a build region is defined between the interface and the adhesion stage; and exposing the polymerization liquid in the build region to a pattern of energy through at least a portion of the member and the dewetting material to polymerize the polymerization liquid and form a green polymer; and advancing the adhesion stage away from the build surface to form the three-dimensional object comprised of the green polymer, wherein the dewetting material is flowed across the member, optionally, under laminar flow conditions and is recirculated under conditions sufficient to dissipate heat and, optionally, maintain a slip boundary between the green polymer and the dewetting material.

Another aspect of the disclosure provides apparatus for forming a three-dimensional object from a polymerization liquid, including: a support; an adhesion stage operatively associated with the support on which adhesion stage the three-dimensional object is formed; a member having a length direction and a width direction, the member having a layer of a dewetting material thereon, the dewetting material having a build surface, with the build surface and adhesion stage defining a build region therebetween; an inlet manifold provided on the member at one end of the length of the member, the inlet manifold having a distribution nozzle in fluid communication with the dewetting material, the distribution nozzle comprising a plurality of individual fluid outlet nozzles spaced across the width direction of the member such that a uniform flow of dewetting material can be provided across the length direction of the member; an outlet manifold provided on the member at the end of the length of the member distal from the inlet manifold, the outlet manifold having a collection nozzle in fluid communication with the dewetting material and in fluid communication with the inlet to provide a recirculation loop and allow for a flow of dewetting material across the member, the collection nozzle comprising a plurality of individual fluid input nozzles spaced across the width direction of the member, the build region being between the inlet manifold and the outlet manifold; a dewetting material reservoir optionally provided along the recirculation loop between the outlet and the inlet configured to supply dewetting material into the build region and dissipate heat from the circulating dewetting fluid; a polymerization liquid supply operatively associated with the build surface and configured to supply polymerization liquid into the build region; an energy source configured to deliver a pattern of energy to the build region through the member and the dewetting material to form a green polymer from the polymerization liquid; at least one controller operatively associated with the energy source for delivering the pattern of energy to the build region, the at least one controller also operatively associated with the adhesion stage for advancing the adhesion stage away from the build surface at a rate that is dependent on energy intensity to form the three-dimensional object, and the at least one controller also operatively associated with the recirculation loop configured to maintain the flow of the dewetting material across the member.

For the methods and apparatus described herein, optional features, including but not limited to components, conditions, and steps are contemplated to be selected from the various aspects, embodiments, and examples provided herein.

Further aspects and advantages will be apparent to those of ordinary skill in the art from a review of the following detailed description. While the methods and apparatus are susceptible of embodiments in various forms, the description hereafter includes specific embodiments with the understanding that the disclosure is illustrative, and is not intended to limit the invention to the specific embodiments described herein.

BRIEF DESCRIPTION OF THE DRAWINGS

FIG. 5A top down view on how isobaric distribution nozzles generate a uniform flow profile of dewetting material across the transparent member.

FIG. 18A shows the isotropic mechanical properties of Type I dog bones printed using methods and apparatus of the disclosure in three orientations, from an ABS-like polyurethane acrylate resin and having mechanical properties comparable to a part cast from the same resin (o) and an injection molded ABS part (□).

FIG. 18B shows the anisotropic mechanical properties of Type I dog bones using fused deposition modeling with ABS and having weaker mechanical properties relative to an injection molded ABS part (□). For comparison, the cast ABS-like resin part of FIG. 18A is replotted (o).

FIG. 19A is a plot of representative height profile scans (surface roughness) along the print direction for a series of dog bones having a thickness of 1 mm and widths ranging from 1-6 mm. The dotted lines represent the bounding constraints of ±1 pixel for the light patterning engine.

FIG. 19B is a plot of representative height profile scans (surface roughness) along the print direction for a series of dog bones having a thickness of 1.5 mm and widths ranging from 1-6 mm. The dotted lines represent the bounding constraints of ±1 pixel for the light patterning engine.

FIG. 19C is a plot of representative height profile scans (surface roughness) along the print direction for a series of dog bones having a thickness of 2 mm and widths ranging from 1-6 mm. The dotted lines represent the bounding constraints of ±1 pixel for the light patterning engine.

FIG. 19D is a plot of representative height profile scans (surface roughness) along the print direction for a series of dog bones having a thickness of 2.5 mm and widths ranging from 1-6 mm. The dotted lines represent the bounding constraints of ±1 pixel for the light patterning engine.

FIG. 20A shows the IR thermal images of an emerging 3D printed part made of hard polyurethane acrylate resin having a cross section of 5 cm×5 cm, vertical print rate of 120 micron/s, and optical resolution of 100 micron using a stationary print interface (dewetting phase is not flowed across the member) and no cooling.

FIG. 20B shows the IR thermal images of an emerging 3D printed part made of hard polyurethane acrylate resin having a cross section of 5 cm×5 cm, vertical print rate of 120 micron/s, and optical resolution of 100 micron using a flowing print interface (dewetting phase is flowed across the member) and no cooling.

FIG. 20C shows the IR thermal images of an emerging 3D printed part made of hard polyurethane acrylate resin having a cross section of 5 cm×5 cm, vertical print rate of 120 micron/s, and optical resolution of 100 micron using a flowing print interface (dewetting phase is flowed across the member) and active cooling.

FIG. 22A shows a hard, machinable polyurethane acrylate part printed using the methods and apparatus of the disclosure (print rate 120 micron/s, optical resolution 100 micron) with a hole drilled against the print direction, confirming continuous printing. Parts prepared with traditional noncontinuous layer-by-layer printing techniques typically delaminate and fracture when drilled in this orientation.

FIG. 22B shows a post-treated silicon carbide ceramic printed lattice printed using methods and apparatus of the disclosure (print rate of green polymer 120 micron/s, optical resolution 100 micron), stands up to a propane torch (about 2000° C.).

FIG. 22C shows a printed butadiene rubber structure printed using methods and apparatus of the disclosure (print rate 30 micron/s, optical resolution 100 micron) in a relaxed state.

FIG. 22D shows a printed butadiene rubber structure printed using methods and apparatus of the disclosure (print rate 30 micron/s, optical resolution 100 micron) under tension.

FIG. 22E shows a printed butadiene rubber structure printed using methods and apparatus of the disclosure (print rate 30 micron/s, optical resolution 100 micron) returns to expanded lattice after compression.

FIG. 22C shows a 1.2 meter hard polyurethane acrylate lattice printed using methods and apparatus of the disclosure (print rate 120 micron/s, optical resolution 100 micron) in less than 3 hours. Scale bars, 1 cm.

DETAILED DESCRIPTION

Figure 1:
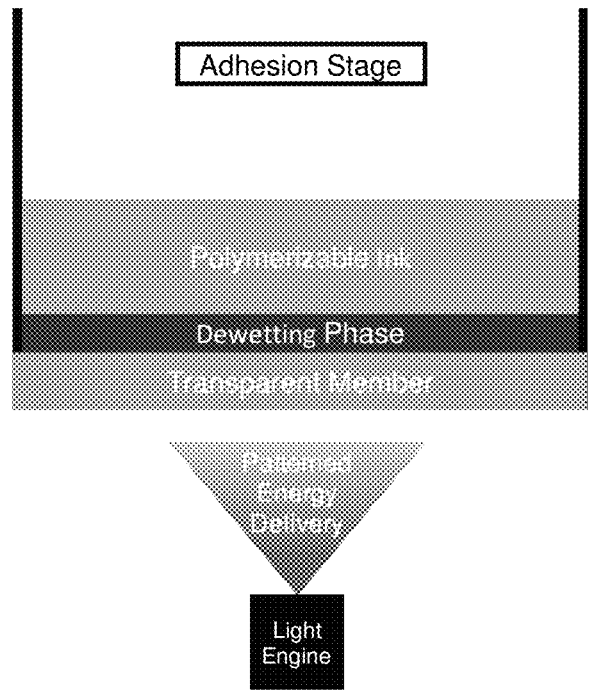
FIG. 1 is a side schematic view of one embodiment of an apparatus useful for carrying out a method as disclosed herein, in particular an apparatus having a transparent member, a dewetting material (dewetting phase) provided on the transparent member, a polymerization liquid (polymerizable ink) provided on the dewetting material, and an adhesion stage.
Figure 2:
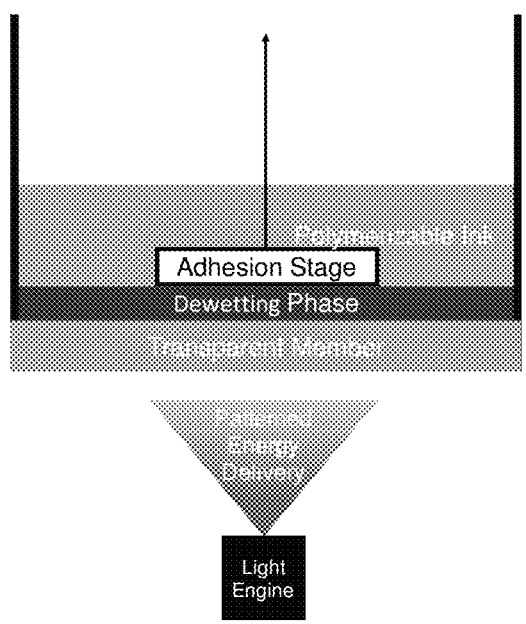
FIG. 2 is a side schematic view of one embodiment of an apparatus carrying out a method as disclosed herein, in particular an apparatus having a transparent member, a dewetting material (dewetting phase) provided on the transparent member, a polymerization liquid (polymerizable ink) provided on the dewetting material, and an adhesion stage.
Figure 3:
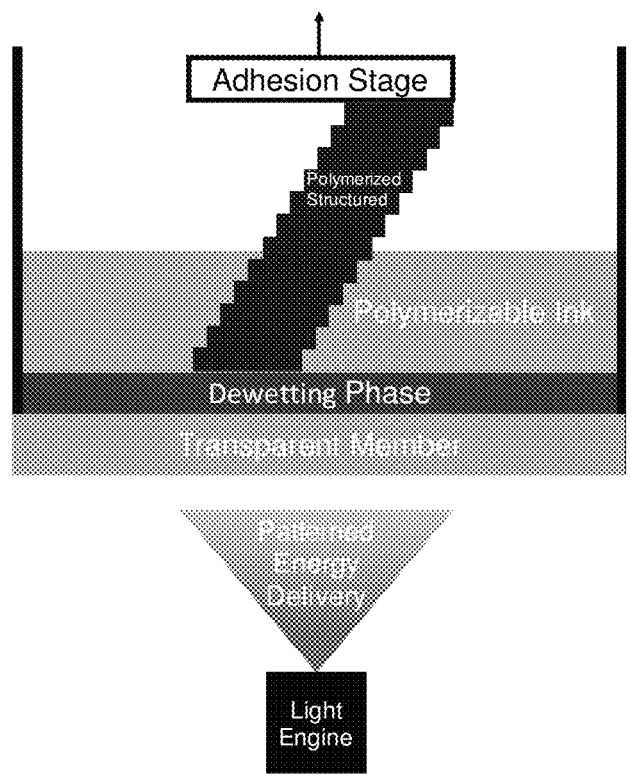
FIG. 3 is a side schematic view of one embodiment of an apparatus carrying out continuous polymerization.
Figure 4:
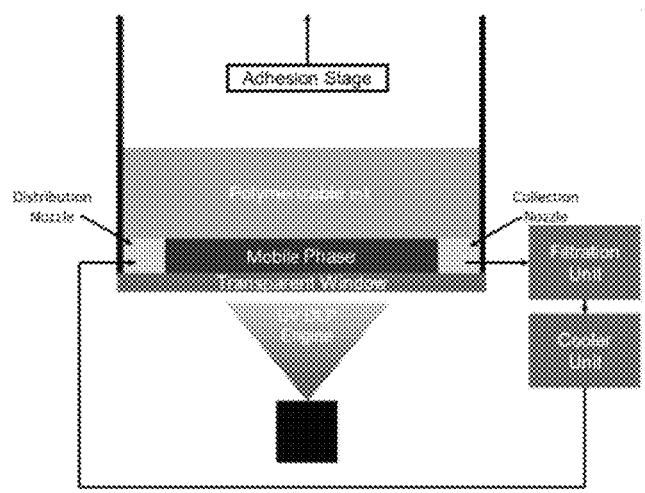
FIG. 4 is a side schematic view of one embodiment of an apparatus useful for carrying out a method as disclosed herein, in particular an apparatus having a transparent member, a dewetting material (mobile phase) provided on the transparent member, a polymerization liquid (polymerizable ink) provided on the dewetting material, and an adhesion stage, wherein the dewetting material is recirculated through a closed loop optionally including a filtration unit and a cooling apparatus.

Provided herein are methods and apparatus of forming a three-dimensional object. In general, the methods of forming a three-dimensional object use an apparatus having a movable adhesion stage separate from a member, the method including flowing a dewetting material across the member, the dewetting material having a build surface; providing a polymerization liquid on the dewetting material, wherein the polymerization liquid is immiscible with the dewetting material such that an interface is defined between the polymerization liquid and the dewetting material and a build region is defined between the interface and the adhesion stage; and exposing the polymerization liquid in the build region to a pattern of energy through at least a portion of the member and the dewetting material to polymerize the polymerization liquid and form a green polymer; and advancing the adhesion stage away from the build surface to form the three-dimensional object comprised of the green polymer, wherein the dewetting material is flowed across the member, optionally, under laminar flow conditions and is recirculated under conditions sufficient to dissipate heat and, optionally, maintain a slip boundary between the green polymer and the dewetting material. Optionally, the methods are performed in an oxygen free environment. Optionally, the methods have a vertical print speed in a range of about 10 μm/s to about 300 μm/s.

As used herein, and unless specified otherwise, a "green polymer" refers to a polymer prepared from the polymerization liquid that is not in a liquid state but has not been fully solidified or cured, for example, a polymer in a gel state, a partially cured state, or a combination thereof.

The methods disclosed herein provide one or more advantages, for example, obviating the need for mechanical separation steps, allowing for continuous printing, providing active cooling over a large area without disrupting the printing mechanism, allowing for printing on large print beds, allowing for rapid print speeds without generating temperatures that result in part degradation, and/or allowing for the continuous regeneration of the build surface and/or removal of microparticulate matter from the dewetting material.

Further still, the slip boundary removes the need for an 'inhibition zone' or "dead zone" in which the act of material deposition (e.g., polymerization) is quenched/inhibited near a build interface. The methods disclosed herein provide gains in efficiency made with respect to the hardware necessary to generate the dead zone and the initial time required to establish and stabilize said dead zone. As a result of these advantages (in simplified hardware, cooling methodologies, and build surface regeneration), the methods disclosed herein have the vertical print speeds at least equal to, if not greater than, the vertical print speeds of CLIP while having much larger build regions than the competing technology. Finally, because the methods and apparatus of the disclosure do not require an oxygen "dead zone", the polymerization liquid can include oxygen-sensitive and/or oxygen-insensitive ink chemistries, significantly increasing the scope of applicable resins and resulting materials.

Polymerization Liquids

As used here, "polymerization liquid" includes a liquid including any small building blocks which combine to form a larger structure, for example, monomers/oligomers cross-linked through traditional polymer chemistry, small particulate/colloidal matter which binds together, metal ions that deposit to form a bulk metallic, or any other number of chemical to micro-scale building blocks.

In embodiments, the polymerization liquid can include a monomer or oligomer, particularly photopolymerizable and/or free radical polymerizable monomers and oligomers, and a suitable initiator such as a free radical initiator. Examples include, but are not limited to, acrylics, methacrylics, acrylamides, styrenics, olefins, halogenated olefins, cyclic olefins, maleic anhydride, vinyl compounds, alkynes, carbon monoxide, functionalized oligomers, multifunctional cure site monomers, functionalized PEGs, mercaptans, siloxanes, etc., including combinations thereof. Examples of liquid resins, monomers and initiators include but are not limited to those set forth in U.S. Pat. Nos. 8,232,043; 8,119,214; 7,935,476; 7,767,728; 7,649,029; WO 2012129968; CN 102715751; JP 2012210408.

In embodiments, the polymerization liquid comprises an aqueous liquid. In refinements of the foregoing embodiment, the polymerization liquid comprises a monomer or oligomer selected from the group consisting of acrylics, methacrylics, urethanes, acrylesters, polyesters, cyanoesters, acrylamides, maleic anhydride, functionalized PEGS, dimethacrylate oligomer, siloxanes, and a combination thereof.

In embodiments, the polymerization liquid comprises an organic liquid. In refinements of the foregoing embodiment, the polymerization liquid comprises a monomer or oligomer selected from the group consisting of olefins, halogenated olefins, cyclic olefins, vinyl compounds, alkynes, mercaptans, and a combination thereof.

In embodiments, the polymerization liquid comprises an aqueous liquid and an organic liquid.

In embodiments, the polymerization liquid is selected from the group consisting of 1,6-hexanediol diacrylate (HDDA), pentaerythritol triacrylate, trimethylolpropane triacrylate (TMPTA), isobornyl acrylate (IBOA), tripropyleneglycol diacrylate (TPGDA), (hydroxyethyl)methacrylate (HEMA), and combinations thereof.

In embodiments, the polymerization liquid comprises a dimethacrylate oligomer and an acrylic or an acrylester monomer or oligomer. In embodiments, the polymerization liquid comprises a siloxane.

In embodiments, the polymerization liquid comprises an oxygen-sensitive polymerization liquid. In embodiments, the polymerization liquid comprises an oxygen-insensitive liquid. In embodiments, the polymerization liquid comprises an oxygen-sensitive and an oxygen-insensitive polymerization liquid. As used herein, and unless specified otherwise, an "oxygen-sensitive" polymerization liquid refers to a polymerization liquid wherein the polymerization of the liquid can be quenched and/or inhibited by the presence of oxygen. As used herein, and unless specified otherwise, an "oxygen-insensitive" polymerization liquid refers to a polymerization liquid wherein the polymerization of the liquid is not affected by the presence of oxygen.

Acid catalyzed polymerization liquids. While in embodiments, as noted above, the polymerization liquid comprises a free radical polymerization liquid, in other embodiments the polymerization liquid comprises an acid catalyzed, or cationically polymerized, polymerization liquid. In such embodiments the polymerization liquid comprises monomers containing groups suitable for acid catalysis, such as epoxide groups, vinyl ether groups, etc. Thus suitable monomers include olefins such as methoxyethene, 4-methoxystyrene, styrene, 2-methylprop-1-ene, 1,3-butadiene, etc.; heterocyclic monomers (including lactones, lactams, and cyclic amines) such as oxirane, thietane, tetrahydrofuran, oxazoline, 1,3, dioxepane, oxetan-2-one, etc., and combinations thereof. A suitable (generally ionic or non-ionic) photoacid generator (PAG) is included in the acid catalyzed polymerization liquid, examples of which include, but are not limited to onium salts, sulfonium and iodonium salts, etc., such as diphenyl iodide hexafluorophosphate, diphenyl iodide hexafluoroarsenate, diphenyl iodide hexafluoroantimonate, diphenyl p-methoxyphenyl triflate, diphenyl p-toluenyl triflate, diphenyl p-isobutylphenyl triflate, diphenyl p-tert-butylphenyl triflate, triphenylsulfonium hexafluororphosphate, triphenylsulfonium hexafluoroarsenate, triphenylsulfonium hexafluoroantimonate, triphenylsulfonium triflate, dibutylnaphthylsulfonium triflate, etc., including mixtures thereof. See, e.g., U.S. Pat. Nos. 7,824,839; 7,550,246; 7,534,844; 6,692,891; 5,374,500; and 5,017,461; see also *Photoacid Generator Selection Guide for the electronics industry and energy curable coatings* (BASF 2010).

Base catalyzed polymerization liquids. In some embodiments the polymerization liquid comprises a base catalyzed polymerization liquid. Suitable base catalyzed polymerization liquids include, but are not limited to, malachite green carbinol base, that produce a hydroxide when irradiated with green light.

Hydrogels. In embodiments, suitable polymerization liquids include photocurable hydrogels like poly(ethylene glycols) (PEG) and gelatins. PEG hydrogels have been used to deliver a variety of biologicals, including Growth factors; however, a great challenge facing PEG hydrogels cross-linked by chain growth polymerizations is the potential for irreversible protein damage. Conditions to maximize release of the biologicals from photopolymerized PEG diacrylate hydrogels can be enhanced by inclusion of affinity binding peptide sequences in the monomer resin solutions, prior to photopolymerization allowing sustained delivery. Gelatin is a biopolymer frequently used in food, cosmetic, pharmaceutical and photographic industries. It is obtained by thermal denaturation or chemical and physical degradation of collagen. There are three kinds of gelatin, including those found in animals, fish and humans. Gelatin from the skin of cold water fish is considered safe to use in pharmaceutical applications. UV or visible light can be used to crosslink appropriately modified gelatin. Methods for crosslinking gelatin include cure derivatives from dyes such as Rose Bengal.

Silicone resins. A suitable polymerization liquid includes silicones. Silicones can be photocurable, or solidified via a Michael reaction between a thiol and a vinyl residue using a radical photo-initiator. Suitable photo-initiators include, but are not limited to, phenylbis(2,4,6-trimethylbenzoyl) phosphine oxide, vinylmethoxysiloxane homopolymer, and (mercaptopropyl)methylsiloxane homopolymer.

Biodegradable resins. Biodegradable polymerization liquids are particularly important for implantable devices to deliver drugs or for temporary performance applications, like biodegradable screws and stents (U.S. Pat. Nos. 7,919,162; 6,932,930). Biodegradable copolymers of lactic acid and glycolic acid (PLGA) can be dissolved in PEG dimethacrylate to yield a transparent resin suitable for use. Polycaprolactone and PLGA oligomers can be functionalized with acrylic or methacrylic groups to allow them to be effective resins for use.

Photocurable polyurethanes. A particularly useful polymerization liquid is photocurable polyurethanes. A photopolymerizable polyurethane composition comprising (1) a polyurethane based on an aliphatic diisocyanate, poly(hexamethylene isophthalate glycol) and, optionally, 1,4-butanediol; (2) a polyfunctional acrylic ester; (3) a photoinitiator; and (4) an anti-oxidant, can be formulated so that it provides a hard, abrasion-resistant, and stain-resistant material (U.S. Pat. No. 4,337,130). Photocurable thermoplastic polyurethane elastomers incorporate photoreactive diacetylene diols as chain extenders.

High performance resins. In some embodiments, polymerization liquids include high performance resins. Such high performance resins may sometimes require the use of heating to melt and/or reduce the viscosity thereof, as noted above and discussed further below. Examples of such resins include, but are not limited to, resins for those materials sometimes referred to as liquid crystalline polymers of esters, ester-imide, and ester-amide oligomers, as described in U.S. Pat. Nos. 7,507,784; 6,939,940. Since such resins are sometimes employed as high-temperature thermoset resins, in the present invention they further comprise a suitable photoinitiator such as benzophenone, anthraquinone, and fluoroenone initiators (including derivatives thereof), to initiate cross-linking on irradiation, as discussed further below.

Additional example resins. Particularly useful resins for polymerization liquids, for dental applications include EnvisionTEC's Clear Guide, EnvisionTEC's E-Denstone Material. Particularly useful resins for hearing aid industries include EnvisionTEC's e-Shell 300 Series of resins. Particularly useful resins include EnvisionTEC's HTM140IV High Temperature Mold Material for use directly with vulcanized rubber in molding/casting applications. A particularly useful material for making tough and stiff parts includes EnvisionTEC's RC31 resin. A particularly useful resin for investment casting applications includes EnvisionTEC's Easy Cast EC500.

Sol-gel polymerization liquids. In some embodiments, the polymerization liquid may comprise a sol solution, or acid-catalyzed sol. Such solutions generally comprise a metal alkoxide including silicon and titanium alkoxides such as silicon tetraethoxide (tetraethyl ortholsilicate; TEOS) in a suitable solvent. Products with a range of different properties can be so generated, from rubbery materials (e.g., using silane-terminated silicone rubber oligomers) to very rigid materials (glass using only TEOS), and properties in between using TEOS combinations with various silane-terminated oligomers. Additional ingredients such as dyes and dopants may be included in the sol solution as is known in the art, and post-polymerization firing steps may be include as is known in the art. See, e.g., U.S. Pat. Nos. 4,765,818; 7,709,597; 7,108,947; 8,242,299; 8,147,918; 7,368,514.

Additional resin ingredients. In embodiments, the polymerization liquid comprises a particulate or colloidal matter capable of binding together. In embodiments, the polymerization liquid comprises metal ions capable of depositing to form a bulk metallic. The polymerization liquid resin or material can have solid particles suspended or dispersed therein. Any suitable solid particle can be used, depending upon the end product being fabricated. The particles can be metallic, organic/polymeric, inorganic, ceramic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can comprise an active agent, though these may also be provided dissolved solubilized in the liquid resin as discussed below. For example, magnetic or paramagnetic particles or nanoparticles can be employed.

The polymerization liquid can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

The polymerization liquid can further comprise one or more additional ingredients dispersed therein, including carbon nanotubes, carbon fiber, and glass filaments.

Polymerization liquids carrying live cells. In some embodiments, the polymerization liquid may carry live cells as "particles" therein. Such polymerization liquids are generally aqueous, and may be oxygenated, and may be considered as "emulsions" where the live cells are the discrete phase. Suitable live cells may be plant cells (e.g., monocot, dicot), animal cells (e.g., mammalian, avian, amphibian, reptile cells), microbial cells (e.g., prokaryote, eukaryote, protozoal, etc.), etc. The cells may be of differentiated cells from or corresponding to any type of tissue (e.g., blood, cartilage, bone, muscle, endocrine gland, exocrine gland, epithelial, endothelial, etc.), or may be undifferentiated cells such as stem cells or progenitor cells. In such embodiments the polymerization liquid can be one that forms a hydrogel, including but not limited to those described in U.S. Pat. Nos. 7,651,683; 7,651,682; 7,556,490; 6,602,975; 5,836,313.

In some embodiments, the polymerization liquid further comprises a photo-initiator. The photo-initiator used depends on the wavelength of the light source being used. When using a higher energy UV source (i.e., a high pressure mercury lamp with emissions in the region from 200 nm to 400 nm) suitable initiators include, but are not limited to, 4,4'-bis(diethylamino)benzophenone (trade name Irgacure EMK) with a primary absorbance centered around 370 nm, phenylbis(2,4,6-trimethylbenzoyl)phosphine oxide (trade name Irgacure 819) with a primary absorbance centered around 300 nm and a secondary absorbance at 370 nm, diphenyl(2,4,6-trimethylbenzoyl)phosphine oxide (trade name Duracure TPO) with a primary absorbance centered around 380 nm with secondary absorbances at 370 nm and 390 nm, and bis(2,6-difluoro-3-(1-hydropyrrol-1-yl)phenyl) titanocene (trade name Irgacure 784, Omnicure 784) which has a primary absorbance at 300 nm with strong secondary absorbances at 398 nm and 470 nm. See also *Photoinitiators for UV Curing Key Products Selection Guide* 2003 (Ciba Specialty Chemicals 2003).

In embodiments, the photo-initiator is phenylbis(2,4,6-trimethylbenzoyl)phosphine oxide. Without intending to be bound by theory it is believed that at a concentration of 0.5% wt, despite the lower solubility of phenylbis(2,4,6-trimethylbenzoyl)phosphine oxide, the overall absorption coefficient and active wavelengths make it the most versatile of the initiators. Further, owing to its secondary absorbance at 370 nm (which is sufficiently broad to extend into the visible domain), phenylbis(2,4,6-trimethylbenzoyl)phosphine oxide can be readily polymerized via a UV source (mercury lamp), a UV-blue LED (centered at 405 nm), a standard off-the-shelf DLP computer projector, and ambient fluorescent lighting.

Further, owing to its secondary absorbance at 370 nm (which is sufficiently broad to extend into the visible domain), phenylbis(2,4,6-trimethylbenzoyl)phosphine oxide can be readily polymerized via a UV source (mercury lamp), a UV-blue LED (centered at 405 nm), a standard off-the-shelf DLP computer projector, and ambient fluorescent lighting.

In some embodiments, the photo-initiator is bis(2,6-difluoro-3-(1-hydropyrrol-1-yl)phenyl)titanocene (trade name Irgacure 784, Omnicure 784) which has a primary absorbance at 300 nm with strong secondary absorbances at 398 nm and 470 nm. Without intending to be bound by theory, bis(2,6-difluoro-3-(1-hydropyrrol-1-yl)phenyl)titanocene allows for the polymerization liquid to be cured using visible light (blue through green sources) and a number of other light sources (such as commercially available LED backlit LCD displays).

In some embodiments, the polymerization liquid further comprises a surfactant. A surfactant can be included in the polymerization liquid to reduce the interfacial surface tension between the polymerization liquid and the dewetting material, and thereby modify the wetting properties of the polymerization liquid and dewetting material. Exemplary surfactants include, but are not limited to, partially fluorinated acrylic polymers (such as Capstone FS-22 and Capstone FS-83 from DuPont (Wilmington, DE)), ionic surfactants, including but not limited to CTAB (hexadecyltrimethylammonium bromide), CPC (cetylpyridinium chloride), DOAB (dimethyldioctadecylammonium bromide), SDS (sodium dodecyl sulfonate), SDBS (Sodium dodecylbenzenesulfonate), and non-ionic surfactants, including but not limited to hexaethylene glycol mono-n- dodecyl ether (C12EO6), polyoxyethylene (2) sorbitan monolaurate (Tween-20; Polysorbate 20), and Tyloxapol.

Dewetting Material

In general, the dewetting material is flowed across the member under laminar flow conditions and recirculated into the build region. The flowing of the dewetting material creates a mobile interface which results in a shear stress beneath the emerging part and results in a slip boundary. The slip boundary allows for the green part to be continuously retraced from the print interface. In embodiments, the dewetting material is continuously recirculated to the build region during the formation of the three-dimensional object. In embodiments, the dewetting material has a uniform velocity profile across the build region during the formation of the three-dimensional object. The movement of the dewetting material can be described relative to the emerging object comprising green polymerized material and/or relative to the energy source responsible for solidifying the polymerization liquid. In embodiments, the dewetting material moves in a plane, wherein the emerging object and/or energy source are substantially normal to said plane (e.g., the dewetting material moves monodirectionally, perpendicular to the advancing of the adhesion stage, or the dewetting material moves rotationally, perpendicular to the advancing of the adhesion stage). In embodiments, the dewetting material moves in a plane, wherein the emerging object and/or energy source would be substantially normal to said plane, and the emerging object and energy source are also in motion (e.g., the emerging object and light engine rotate on a common axis, while the dewetting material moves laterally relative to the object, wherein the rotational axis is normal to the dewetting material plane).

The dewetting material can include an aqueous liquid, an organic liquid, a silicone liquid and a fluoro liquid. Aqueous liquids can include, but are not limited to, water, deuterium oxide, densified salt solutions, densified sugar solutions, and combinations thereof. Example salts and their solubility limit in water at approximately room temperature include NaCl 35.9 g/100 ml, NaBr 90.5 g/100 ml, KBr 67.8 g/100 ml, $MgBr_2$ 102 g/100 ml, $MgCl_2$ 54.3 g/100 ml, sodium acetate 46.4 g/100 ml, sodium nitrate 91.2 g/100 ml, $CaBr_2$ 143 g/100 ml, $CaCl_2$) 74.5 g/100 ml, $Na_2CO_3$ 21.5 g/100 ml, $NH_4Br$ 78.3 g/100 ml, LiBr 166.7 g/100 ml, KI 34.0 g/100 ml, and NaOH 109 g/100 ml. Thus, for example, a 100 ml solution of 35.9 g NaCl has a density of 1204 kg/m$^3$. Example sugars and their solubility limit in water at approximately room temperature include sucrose 200 g/ml, maltose 108 g/100 ml, and glucose 90 g/100 ml. Thus, for example, a 60% sucrose water solution has a density of 1290 kg/m$^3$ at room temperature. Silicone liquids can include, but are not limited to silicone oils. Silicone oils are liquid polymerized siloxanes with organic side chains. Examples of silicone oils include polydimethylsiloxane (PDMS), simethicone, and cyclosiloxanes. Fluoro liquids can include, but are not limited to, fluorinated oils. Fluorinated oils generally include liquid perfluorinated organic compounds. Examples of fluorinated oils include perfluoro-n-alkanes, perfluoropolyethers, perfluoralkylethers, co-polymers of substantially fluorinated molecules, and combinations of the foregoing. Organic liquids can include, but are not limited to, organic oils, organic solvents, including but not limited to chlorinated solvents (e.g., dichloromethane, dichloroethane and chloroform), and organic liquids immiscible with aqueous systems. Organic oils include neutral, nonpolar organic compounds that are viscous liquids at ambient temperatures and are both hydrophobic and lipophilic. Examples of organic oils include, but are not limited to higher density hydrocarbon liquids. In embodiments, the dewetting material comprises a silicone liquid, a fluoro liquid, or a combination thereof.

In embodiments, the dewetting material is flowed across the member under laminar flow conditions. In embodiments, the dewetting material is recirculated under conditions sufficient to maintain a slip boundary between the green polymer and the dewetting material. In embodiments, the dewetting material is flowed across the member under laminar flow conditions and is recirculated under conditions sufficient to maintain a slip boundary between the green polymer and the dewetting material. The flow of the dewetting material can be at a rate to remain in the laminar flow regime, to avoid interfacial turbulence, while generating a slip boundary between the polymerization liquid phase and the dewetting material. In general, the volumetric flux of the dewetting material can be any volumetric flux that provides a slip-boundary. In embodiment, the volumetric flux of the dewetting material near or at an interface with the green polymer is greater than zero. In embodiments, the volumetric flux of the dewetting material at an interface with the green polymer is in a range of about 0.05 mm/s to about 10 mm/s, for example, about 0.05 mm/s to about 10 mm/s, about 0.1 mm/s to about 10 mm/s, about 0.5 mm/s to about 10 mm/s, about 1 mm/s to about 10 mm/s, about 0.05 mm/s to about 1 mm/s, about 0.1 mm/s to about 0.9 mm/s, about 0.2 mm/s to about 0.9 mm/s, about 1 mm/s to about 9 mm/s, about 1 mm/s to about 8 mm/s, about 1 mm/s to about 7 mm/s, about 2 mm/s to about 10 mm/s, about 2 mm/s to about 9 mm/s, about 2 mm/s to about 8 mm/s, about 2 mm/s to about 7 mm/s, about 0.05 mm/s, about 0.1 mm/s, about 0.5 mm/s, about 1 mm/s, about 2 mm/s, about 3 mm/s, about 4 mm/s, about 5 mm/s, about 6 mm/s, about 7 mm/s, about 8 mm/s, about 9 mm/s, or about 10 mm/s.

Figure 5A:
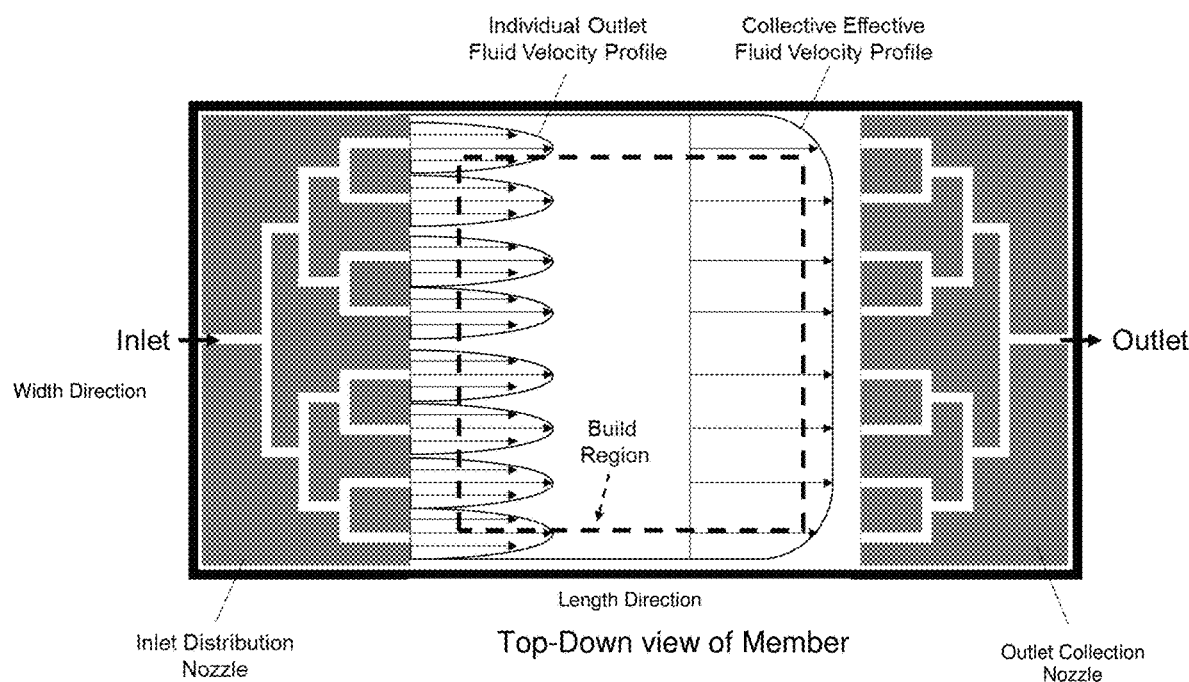
Figure 5B:
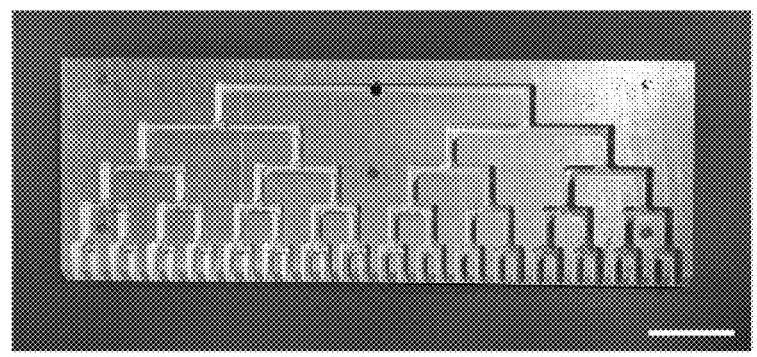
FIG. 5B is a distribution manifold having an inlet and a plurality of individual fluid outlet nozzles.

Generation of a laminar flow profile can be facilitated by using distribution nozzles which generate a plurality of isobaric individual fluid outlets and inlets from a single high-flow inlet and outlet (e.g., as shown in FIG. 5A). The distribution nozzle including individual fluid inlets is also referred to herein as the collection nozzle. The number of individual fluid outlets and inlets at the distribution nozzles is not particularly limited. In general, the distribution nozzles include at least two individual fluid outlets or inlets. In general, the distribution nozzles include as many individual fluid outlets or inlets as can be provided, and being limited by the ability to manufacture a distribution nozzle manifold having consistent channel sizes and providing isobaric individual fluid outlets and inlets. In embodiments, the distribution nozzle can include as many as 100 or 1000 individual fluid outlets or inlets. In embodiments, the individual fluid outlets and inlets can be evenly distributed along the distribution nozzles. In embodiments, the individual fluid outlets and inlets can be unevenly distributed along the distribution nozzles, provided that the individual fluid outlets and inlets are isobaric. In embodiments, the individual fluid outlets can be evenly distributed along the distribution nozzle and the individual fluid inlets can be unevenly distributed along the collection nozzle, provided that the individual fluid inlets are isobaric. In embodiments, the individual fluid outlets can be unevenly distributed along the distribution nozzle, provided the individual fluid outlets are isobaric, and the individual fluid inlets can be evenly distributed along the collection nozzle.

The dewetting material can be recirculated through a closed loop. In some cases a dewetting material reservoir can be provided along the recirculation loop to facilitate dissipation of heat from the flowing dewetting material. In some cases, the dewetting material moves from a first, dewetting material supply reservoir to a second, dewetting material capture reservoir and is not recirculated through a closed loop. The dewetting material can be collected from the second reservoir, optionally filtered, cleaned, and/or decontaminated, and returned back to the first supply reservoir for reuse. The dewetting material at the second reservoir can be optionally filtered, cleaned, and/or decontaminated, and the flow direction reversed so as to return the dewetting material to the first reservoir.

In embodiments, the dewetting material is optically transparent. As used herein, unless specified otherwise, "optically transparent" means the optically transparent element allows from 1% to 100% transmittance of the energetic event initiating solidification of the polymerization liquid. In some cases, at least 40%, at least 50%, at least 60%, at least 70%, at least 80%, or at least 90% of the energetic event is transmitted through the optically transparent element. An optically transparent element can allow transmittance of a broad range of wavelengths, including, but not limited to, wavelengths corresponding to X-Ray radiation, ultraviolet (UV) light radiation, visible light radiation, infrared (IR) radiation, and microwave radiation.

The dewetting material can further include a surfactant. A surfactant can be included in dewetting material to reduce the interfacial surface tension between the polymerization liquid and the dewetting material. Exemplary surfactants include, but are not limited to, partially fluorinated acrylic polymers (such as Capstone FS-22 and Capstone FS-83 from DuPont (Wilmington, DE)), ionic surfactants, including but not limited to CTAB (hexadecyltrimethylammonium bromide), CPC (cetylpyridinium chloride), DOAB (dimethyldioctadecylammonium bromide), SDS (sodium dodecyl sulfonate), SDBS (Sodium dodecylbenzenesulfonate), and non-ionic surfactants, including but not limited to hexaethylene glycol mono-n-dodecyl ether (C12EO6), polyoxyethylene (2) sorbitan monolaurate (Tween-20; Polysorbate 20), and Tyloxapol.

In general, the polymerization liquid is immiscible with the dewetting material. Aspects of the methods disclosed herein rely upon the use of a phase boundary as a build region that can be molecularly smooth due to interfacial surface tension of the dewetting material and the polymerization liquid that together constitute the interfacial system. In embodiments, the dewetting material and polymerization liquid are "de-wetting" allowing for polymerization to occur without strong adhesive forces between the solidified polymer and the underlying phase. As a result of these low forces, the green 'printed' material can be easily lifted off of the surface in a continuous manner. In embodiments, the spreading coefficient, $S_{PL/D}$, for the dewetting material (D) and the polymerization liquid (PL) is low to negative. In embodiments, the dewetting material and the polymerization liquid have a contact angle of greater than 60°, or greater than 90° when the polymerization liquid and/or dewetting material is substantially free of surfactant. In embodiments, the dewetting material and the polymerization liquid phase have a contact angle of greater than 60°, when the polymerization liquid is substantially free of surfactant. As used herein, unless specified otherwise, "substantially free of surfactant" refers to a concentration of surfactant of less than about 500 ppm, less than about 250 ppm, less than about 100 ppm, or less than about 50 ppm, or less than about 10 ppm.

As used herein, "dewetting" means that the phases repel one another. The property of "dewetting" or "wetting" is related to the concept of contact angle. The contact angle refers to the angle formed when one liquid is placed on top of another (liquid or solid; in the present case liquid) surface. A contact angle of zero degrees indicates perfectly wetting properties; a contact angle between zero and ninety degrees generally indicates high wetting properties; a contact angle between ninety and one hundred and eighty degrees generally indicates low wetting properties; a contact angle of 180 degrees indicates perfectly non-wetting properties. It is not required that perfect dewetting be achieved, and some higher wettability combinations may be satisfactory in some circumstances as described below, but it is generally preferred that the contact angle between the polymerization liquid and dewetting material, during the polymerization steps, greater than 60° be achieved. If such dewetting is not inherently achieved by the particular combination of polymerization liquid and dewetting material, wettability between the two liquids can be decreased by the inclusion of one or more surfactants, co-solvents, pH or temperature so as to change the surface tension of the polymerization liquid and the contact angle at the phase interface.

Figure 8:
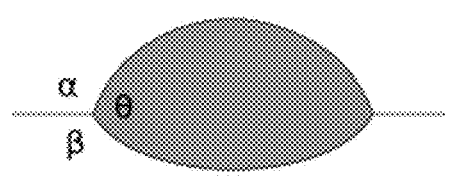
FIG. 8 is a diagram of the phase interface and the dewetting angles for a three phase system.

It should be noted that contact angles are generally defined for solid-liquid-gas interfaces. Thus, dewetting or wetting is usually defined for a combination of a solid, a liquid, and a gas (when a gas phase is not specified, it is taken to be air at standard temperature and pressure). Further, it should be noted that just because one phase is a solid, it does not necessarily mean that that phase will support the weight of the second phase and it could be deformed as a result of that weight. For example, when considering the arrangement shown in FIG. 8, when the bottom phase is not a rigid solid, β does not have to be 180°. As a result, it can be more tractable to define the three phase-interface in terms of α, as opposed to θ. When β is not equal to 180°, a dewetting interface can be defined as an interface having a value of α of less than 90°, as this dewetting angle has a lower dependence on the deformation of the β phase. In embodiments, the dewetting material and the polymerization liquid have a contact angle of greater than 60°. In embodiments, the dewetting material and the polymerization liquid have a contact angle of greater than 90°. In embodiments, the dewetting material and the polymerization liquid have an interface having a value of α of less than 90°.

Further, contact angles can be defined between two liquids on a solid interface (e.g., a submerged droplet) which is often the case where one is looking at submerged surfaces. As a result the contact angle is described in terms of all three phases (such as a droplet of chloroform sitting on a surface which is submerged in water).

Dewetting (or wetting) at a liquid-liquid interface is also related to the spreading coefficient. For the case of liquid B spreading over liquid A, the relevant equation is:

$$S_{B/A} = \gamma_A - \gamma_B - \gamma_{AB}$$

where: S is the spreading coefficient, $\gamma_A$ is the surface tension of liquid A, $\gamma_B$ is the surface tension of liquid B, and $\gamma_{AB}$ is the interfacial tension between A and B. If the spreading coefficient is greater than zero, liquid B will spontaneously spread over liquid A. That is, liquid A and B are wetting. Note the value of the reverse spreading coefficient $S_{A/B}$ will be different than $S_{B/A}$. In the methods of the disclosure, the slip condition arises when the dewetting material/polymerization liquid interface has a small to negative spreading coefficient. Without intending to be bound by theory, it is believed that when the spreading coefficient of the dewetting material/polymerization liquid interface is negative, a slip condition will be present for any velocity/volumetric flux of the dewetting material. It is further believed that if a low wetting dewetting material is used, such that the spreading coefficient is greater than zero, but low, a slip condition can be achieved by flowing at a high velocity/volumetric flux. A low spreading coefficient can be in a range of about 10 or less, about 5 or less, about 2.5 or less, about 2 or less, about 1 or less, about 0.5 or less, or about 0.1 or less. In embodiments, the spreading coefficient between the dewetting material and the polymerization liquid is about 1 or less, or negative. In embodiments, the spreading coefficient between the dewetting material and the polymerization liquid is about 0.5 or less, or negative. In embodiments, the spreading coefficient between the dewetting material and the polymerization liquid is about 0.1 or less, or negative.

Without intending to be bound by theory, it is believed that because the dewetting material is a mobile phase, the dewetting material and the polymerization liquid can have higher wetting properties (e.g., a contact angle of less than 90°, e.g., about 60°), when the dewetting material and the polymerization liquid are substantially free of surfactant, because the flowing of the dewetting material provides reduced adhesive forces, which compensates for the higher wettability.

Because the methods of the disclosure allow for polymerization to occur without strong adhesive forces between the solidified polymer and the underlying dewetting phase, the polymerization liquid does not require a dead zone or inhibition zone. Accordingly, in embodiments, the polymerization liquid does not include a dead zone.

The dewetting material can generally be any material that can be flowed across the member. As used herein, and unless specified otherwise, the "dewetting material" can include liquids, gels, solids, and combinations thereof. In embodiments, the dewetting material comprises a gel. In embodiments, the dewetting material comprises a gel selected from the group consisting of an organo-gel, a silicone-gel, an aqueous hydro-gel, a fluoro-gel, and a combination thereof. In refinements of the foregoing embodiment, the dewetting material is an aqueous hydro-gel and the aqueous hydro-gel is selected from the group consisting of agar, agarose gels, polyacrylamide gels, starch gels, cationic gels, anionic gels, and combinations thereof. In refinements, the dewetting material is a fluoro-gel and the fluoro-gel comprises 2-(perfluorohexyl)ethyl acrylate swelled with perfluoropolyether.

In embodiments, the dewetting material comprises a liquid. The liquid dewetting material can include an aqueous based liquid, an organic based liquid, a silicone based liquid, a fluorinated based liquid, and a combination thereof. In embodiments, the liquid dewetting material comprises a silicone based liquid, a fluorinated based liquid, or a combination thereof. Fluorinated based liquids can include, but are not limited to, perfluoro-n-alkanes, perfluoropolyethers, perfluoralkylethers, co-polymers of substantially fluorinated molecules, and combinations of the foregoing. In embodiments, the dewetting material comprises a fluorinated oil.

In embodiments, the dewetting material can comprise a solid. In embodiments, the dewetting material can include a solid and a liquid, or only a solid. In embodiments wherein the dewetting material is a solid, the flowing of the dewetting material across the member comprises moving the solid across the member. The solid dewetting material can be selected from the group consisting of an organic solid, an aqueous solid, a per-fluorinated solid, and a combination thereof. Organic solids can include, but are not limited to, squalane, squalene, solid hexadecane, and a combination thereof. Aqueous solids can include, but are not limited to ice, solid tetraethylene glycol, solid PEG-300 (i.e., a polyethylene glycol having a molecular weight of 300 Da), solid PEG-400, solid PEG-600, solid higher molecular weight PEGs, and combinations thereof. Per-fluorinated solids can include, but are not limited to, perfluoropolyether, fluorinated ethylene propylene, polytetrafluoroethylene, and combinations thereof. In refinements, the dewetting material is a per-fluorinated solid and the per-fluorinated solid comprises a solid perfluoropolyether. A solid can move across the member relative to the emerging object by, e.g., use of a conveyor.

The viscosity of the dewetting material at 25° C. is not particularly limited, provided that the dewetting material can be flowed across the member. In embodiments, the dewetting material has a viscosity in a range of about 10,000 cP or less.

Slip Boundary

In general, the methods of the disclosure occur under conditions sufficient to form a slip boundary at the interface of the green polymer and the dewetting material. A slip boundary, or slip condition, is present in a system wherein near or at a solid(ifying) boundary, the fluid has a greater than zero velocity relative to the solid(ifying) boundary. Without intending to be bound by theory, it is believed that in general, fluid particles close to a surface do not move along with a flow when adhesion forces with the surface are stronger than cohesion forces with the fluid. Thus, without intending to be bound by theory, it is believed that at the fluid-green polymer interface, if the force of attraction between the fluid particle and green polymer particles (adhesion) is greater than that between fluid particles (cohesion), the fluid velocity at the boundary with the green polymer will be zero and a slip condition is not present. As used herein, the terms "fluid velocity," "velocity," and "volumetric flux" are being used interchangeably, unless indicated otherwise. In general, the velocity of the dewetting material near or at the interface with the solidifying polymer is greater than zero. In embodiments, the velocity of the dewetting material at the interface with the solidifying polymer is in a range of about 0.05 mm/sec to about 10 mm/sec. As the velocity of the dewetting material at the interface with the solidifying polymer decreases below about 0.05 mm/sec, but remains above zero, a slip boundary may still be present, however the reduction in adhesive forces between the solidifying polymer and the dewetting material provided by the mobility of the dewetting material may not be as pronounced as when the velocity of the dewetting material at the interface with the solidifying polymer is about 0.05 mm/sec and above. Further, as the velocity of the dewetting material at the interface with the solidifying polymer increases above about 10 mm/sec, a slip boundary will still be present, however, the likelihood of turbidity in the flow of the dewetting material increases. Turbidity in the dewetting material would be disadvantageous as it would give rise to a non-level dewetting material/polymerization liquid interface. Maintaining a level interface prevents optical distortions of the light patterns passing through it.

In embodiments, the conditions sufficient to provide a slip boundary between the green polymer and the dewetting material comprises selecting the dewetting material and the polymerization liquid such that the dewetting material (D) and the polymerization liquid (PL) have a spreading coefficient, $S_{PL/D}$, of less than zero. In embodiments, the conditions sufficient to provide a slip boundary between the green polymer and the dewetting material comprises selecting the dewetting material and the polymerization liquid such that the volumetric flux of the dewetting material near or at an interface with the green polymer is greater than zero. In embodiments, the volumetric flux of the dewetting material at an interface with the green polymer is in a range of about 0.05 mm/s to about 10 mm/s, for example, about 0.05 mm/s to about 10 mm/s, about 0.1 mm/s to about 10 mm/s, about 0.5 mm/s to about 10 mm/s, about 1 mm/s to about 10 mm/s, about 0.05 mm/s to about 1 mm/s, about 0.1 mm/s to about 0.9 mm/s, about 0.2 mm/s to about 0.9 mm/s, about 1 mm/s to about 9 mm/s, about 1 mm/s to about 8 mm/s, about 1 mm/s to about 7 mm/s, about 2 mm/s to about 10 mm/s, about 2 mm/s to about 9 mm/s, about 2 mm/s to about 8 mm/s, about 2 mm/s to about 7 mm/s, about 0.05 mm/s, about 0.1 mm/s, about 0.5 mm/s, about 1 mm/s, about 2 mm/s, about 3 mm/s, about 4 mm/s, about 5 mm/s, about 6 mm/s, about 7 mm/s, about 8 mm/s, about 9 mm/s, or about 10 mm/s.

Without intending to be bound by theory, it is believed that the print quality of a three-dimensional object formed in a continuous print process can be improved by providing a dewetting material that is dewetting relative to the polymerization liquid, flowing the dewetting material across the member, or a combination thereof. Further, without intending to be bound by theory, selecting a dewetting material that is dewetting relative to the polymerization liquid can improve the print quality by reducing adhesive forces between the emerging parts and the dewetting material as well as facilitating the formation of a slip boundary between the emerging parts and the dewetting material. Further still, without intending to be bound by theory, flowing the dewetting material across the member can improve the print quality by further reducing the adhesive forces between the emerging parts and the dewetting material by forming a slip boundary.

In embodiments, the conditions sufficient to provide a slip boundary between the green polymer and the dewetting material comprises selecting the dewetting material and the polymerization liquid such that the print quality of the three-dimensional object is improved relative to the print quality of a three-dimensional object prepared from an identical system except the dewetting material is stationary and not flowed across the member. In embodiments, the conditions sufficient to provide a slip boundary between the green polymer and the dewetting material comprises selecting the dewetting material and the polymerization liquid such that the print quality is improved relative to the print quality of a three-dimensional object prepared from an identical system except (a) the dewetting material is not dewetting relative to the polymerization liquid, or (b) the dewetting material is not dewetting relative to the polymerization liquid and the dewetting material is stationary and not flowed across the member.

Figure 17:
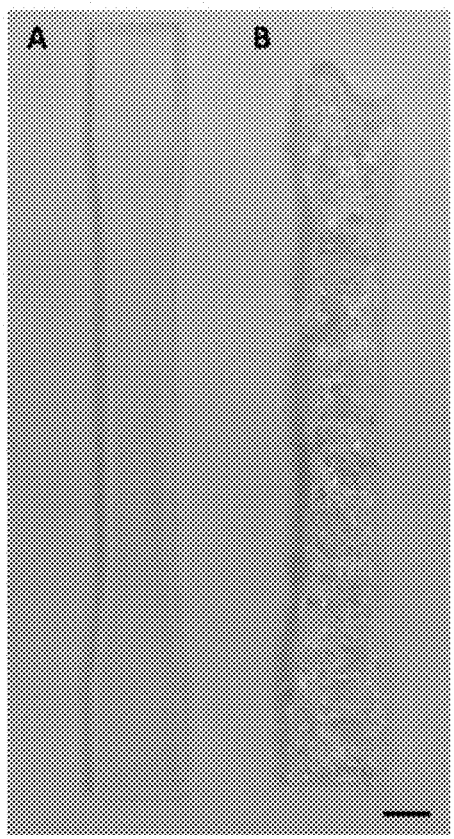
FIG. 17 is a photo of two printed ASTM D638 Type I dog bones. On the left, a printed part using a dewetting material that was dewetting relative to the polymerization liquid and which was flowed across the membrane. On the right, a printed part using a dewetting material that was wetting relative to the polymerization liquid and which was stationary; this part appeared "flaky" and hollow parts were observed owing to the subpar dewetting behavior of the immiscible phase. Parts were printed with a hard urethane acrylate resin, a monochromatic US source (100 micron optical resolution), and a TPO photoinitiator. Scale bar is 1 cm.

As demonstrated in Example 8, below, the improvement in print quality can be visually observed. In particular, an acceptable print quality will have consistent lateral resolution, a smooth appearance/feel (minimal surface roughness), well defined edges, and will not have "flaky" or hollow portions. FIG. 17, demonstrates such an acceptable print with the print on the left, which has an improved print quality over the print on the right, which was printed with an immiscible liquid that was not non-wetting relative to the polymerization liquid and was not flowed across the member.

A slip-boundary can be present between a liquid/solid interface, wherein the solid is in motion relative to the liquid and de-wetting. For example, a slip-boundary can be provided between a "slippery" film that is in motion under the polymerization liquid.

Polymerization Initiator/Energy Source

Fabrication of the three-dimensional object from the polymerization liquid requires an initiation event which induces solidification or deposition from the polymerization liquid to form the green polymer. The deposition can be, for example, light activated, electrically activated, thermally activated, and/or magnetically activated. In embodiments, polymerization is performed by electromagnetic irradiation. In embodiments, polymerization is performed by electricity. In embodiments, polymerization is performed by thermal activation. In embodiments, polymerization is performed by magnetic activation.

In embodiments, the method is performed in parallel using a multi-tip array and the tip of the multi-tip array comprises the member. The multi-tip array can be from a Beam Pen Lithography system and/or from a Polymer Pen Lithography system.

Beam-Pen Lithography In embodiments, the multi-tip array is part of a beam pen lithography system. Beam Pen Lithography (BPL) is described in, for example, U.S. Pat. No. 9,021,611, herein incorporated by reference in its entirety. BPL can allow for patterning of sub-micron features over large areas with flexible pattern design, convenient, selective pen tip addressability, and low fabrication cost. As compared to conventional photolithography or contact printing in which only pre-formed patterns (i.e. photomasks) can be duplicated, BPL can provide the flexibility to create different patterns by controlling the movement of a tip array over the substrate and/or by selectively illuminating one or more of the pen tips in the tip array (e.g., selectively allowing energy to pass through one or more of the pen tips in the tip array to initiate polymerization of the polymerization liquid). Thus, multiple objects, for example, can be fabricated in a parallel fashion.

A BPL tip array includes a tip substrate layer and a plurality of tips fixed to the tip substrate layer. The tip substrate layer and the plurality of tips are formed of a transparent polymer. The tip substrate layer and the tips can be formed of the same polymer or can be formed of different polymers. The tip array further includes a blocking layer coated on the sidewalls of the tips and on the portions of the tip substrate layer between adjacent tips. An aperture is defined in the blocking layer at the tip end (e.g., the photosensitive layer-contacting end of each of the tips), such that the transparent polymer tip end is exposed through the aperture.

The tip substrate layer can be attached to a transparent (e.g., optically transparent) rigid support, for example, formed from glass, silicon, quartz, ceramic, polymer, or any combination thereof. The rigid support is preferably highly rigid and has a highly planar surface upon which to mount the tip array.

The tip arrays are non-cantilevered and comprise tips which can be designed to have any shape or spacing (pitch) between them, as needed. The shape of each tip can be the same or different from other tips of the array, and preferably the tips have a common shape. Contemplated tip shapes include spheroid, hemispheroid, toroid, polyhedron, cone, cylinder, and pyramid (trigonal or square). The tips have a base portion fixed to the tip substrate layer. The base portion preferably is larger than the tip end portion. The base portion can have an edge length in a range of about 1 μm to about 50 μm, or about 5 μm to about 50 μm. A preferred tip array contains thousands of tips, preferably having a pyramidal shape. The substrate-contacting (tip end) portions of the tips each can have a diameter in a range of about 50 nm to about 1 μm. The substrate-contacting portions of the tips are preferably sharp, so that each is suitable for forming sub-micron patterns, e.g., less than about 500 nm. The sharpness of the tip is measured by its radius of curvature. The tips can have a radius of curvature, for example, of below about 1 µm. The tip-to-tip spacing between adjacent tips (tip pitch) can be in a range of about 1 µm to about over 10 mm.

The blocking layer on the polymer tip sidewalls serves as a radiation blocking layer, allowing the radiation illuminated on a surface of the substrate layer opposite the surface to which the tips are fixed to be emitted only through the tip end exposed by the aperture defined in the blocking layer. The exposure of a substrate pre-coated with a resist layer with the radiation channeled through the tip ends of the tip array can allow for polymerization of the polymerization liquid at each tip end. The blocking layer can be formed of any material suitable for blocking (e.g., reflecting) a type of radiation used in the lithography process. For example, the blocking layer can be a metal, such as gold, when used with UV light. Other suitable blocking layers include, but are not limited to, gold, chromium, titanium, silver, copper, nickel, silicon, aluminum, opaque organic molecules and polymers, and combinations thereof. The blocking layer can have any suitable thickness, for example in a range of about 40 nm to about 500 nm.

Polymeric materials suitable for use in the tip array can have linear or branched backbones, and can be cross-linked or non-cross-linked, depending upon the particular polymer and the degree of compressibility desired for the tip. Cross-linkers refer to multi-functional monomers capable of forming two or more covalent bonds between polymer molecules. Non-limiting examples of cross-linkers include such as trimethylolpropane trimethacrylate (TMPTMA), divinylbenzene, di-epoxies, tri-epoxies, tetra-epoxies, di-vinyl ethers, tri-vinyl ethers, tetra-vinyl ethers, and combinations thereof.

Thermoplastic or thermosetting polymers can be used, as can cross-linked elastomers. In general, the polymers can be porous and/or amorphous. A variety of elastomeric polymeric materials is contemplated, including polymers of the general classes of silicone polymers and epoxy polymers. Polymers having low glass transition temperatures such as, for example, below 25° C. or more preferably below −50° C., can be used. Diglycidyl ethers of bisphenol A can be used, in addition to compounds based on aromatic amine, triazine, and cycloaliphatic backbones. Another example includes Novolac polymers. Other contemplated elastomeric polymers include methylchlorosilanes, ethylchlorosilanes, and phenylchlorosilanes, polydimethylsiloxane (PDMS). Other materials include polyethylene, polystyrene, polybutadiene, polyurethane, polyisoprene, polyacrylic rubber, fluorosilicone rubber, and fluoroelastomers.

Further examples of suitable polymers that may be used to form a tip can be found in U.S. Pat. Nos. 5,776,748; 6,596,346; and 6,500,549, each of which is hereby incorporated by reference in its entirety. Other suitable polymers include those disclosed by He et al., *Langmuir* 2003, 19, 6982-6986; Donzel et al., *Adv. Mater.* 2001, 13, 1164-1167; and Martin et al., *Langmuir*, 1998, 14-15, 3791-3795. Hydrophobic polymers such as polydimethylsiloxane can be modified either chemically or physically by, for example, exposure to a solution of a strong oxidizer or to an oxygen plasma.

The polymer of the tip array can be a polymer gel. The gel polymer can comprise any suitable gel, including hydrogels and organo-gels. For example, the polymer gel can be a silicon hydrogel, a branched polysaccharide gel, an unbranched polysaccharide gel, a polyacrylamide gel, a polyethylene oxide gel, a cross-linked polyethylene oxide gel, a poly(2-acrylamido-2-methyl-1-propanesulfonic acid) (polyAMPS) gel, a polyvinylpyrrolidone gel, a cross-linked polyvinylpyrrolidone gel, a methylcellulose gel, a hyaluronan gel, and combinations thereof. For example, the polymer gel can be an agarose gel. By weight, gels are mostly liquid, for example the gel can be greater than 95% liquid, yet behave like a solid due to the presence of a cross-linked network within the liquid.

The material used to form the tip array has a suitable compression modulus and surface hardness to prevent collapse of the tip during contact with the surface, but too high a modulus and too great a surface hardness can lead to a brittle material that cannot adapt and conform to a substrate surface during exposure. As disclosed in Schmid, et al., *Macromolecules,* 33:3042 (2000), vinyl and hydrosilane prepolymers can be tailored to provide polymers of different modulus and surface hardness. Thus, in another type of embodiment, the polymer can be a mixture of vinyl and hydrosilane prepolymers, wherein the weight ratio of vinyl prepolymer to hydrosilane crosslinker is about 5:1 to about 20:1.

The tip array and/or the build region can be moved during patterning to form the desired object. For example, in one embodiment, the tip array is moved while the build region is held stationary. In another embodiment, the tip array is held stationary while the build region is moved. In yet another embodiment, both the tip array and the build region are moved.

When using large-scale 2D arrays of BPL tips (15,000 pens per cm$^2$), BPL can be used to do very high throughput lithography, yielding thousands of parallel-produced 3D objects at a time. The objects can be the same, for example by using a uniform tip array. In the alternative, at least some of the objects can differ from each other, for example by using a tip array which is non-uniformly masked and lateral displacement of the tip array while printing which exceeds the tip pitch dimension.

Another factor contributing to BPL resolution is the tip aperture size, which controls the area exposed to light from the tip. With a near UV light or halogen light source and conventional photolithography conditions, objects close to and below the light diffraction limit, of about 200 nm can be created.

Large arrays of objects can be made simultaneously by moving the array of the surface while illuminating the tip array from the back side of the tips, for example, through the tip substrate layer. The radiation can be kept on during the entire process.

The individual tips within a BPL array can be addressed by selective illumination. For example, fewer than all of the tips in the array can be illuminated, for example one or a selected plurality of the tips in the tip array. Selective illumination of the tips can be performed, for example, by selectively focusing light through the bases of each tip. The tip array can also include one or more spatial light modulators capable of blocking certain tips from exposure to the light. The spatial light modulators can be static and/or dynamically controllable. For example, the spatial light modulates can be shutters. The spatial light modulators can be formed using a variety of materials, including, for example, liquid crystals. The spatial light modulators can be, for example, a mask, which is not dynamically controllable. The spatial light modulators can be placed or formed as a part of the tip substrate layer.

Polymer Pen Lithography. In embodiments, the multi-tip array is part of a polymer pen lithography system. Polymer Pen Lithography is a direct-write method that delivers collections of molecules in a positive printing mode. Polymer Pen Lithography utilizes elastomeric tips without cantilevers. The tips are preferably made of polydimethylsiloxane, PDMS. A preferred polymer pen array contains thousands of tips, preferably having a pyramidal shape, which can be made with a master prepared by conventional photolithography and subsequent wet chemical etching. The tips preferably are connected by a common substrate which includes a thin polymer backing layer (50-100 μm thick), which preferably is adhered to a rigid support (e.g., a glass, silicon, quartz, ceramic, polymer, or any combination thereof), e.g. prior to or via curing of the polymer. The rigid support is preferably highly rigid and has a highly planar surface upon which to mount the array (e.g., silica glass, quartz, and the like). The rigid support and thin backing layer significantly improve the uniformity of the polymer pen array over large areas, such as three inch wafer surface, and make possible the leveling and uniform, controlled use of the array. Polymer pen tip arrays are disclosed in, e.g., WO 2009/132321, the disclosure of which is incorporated by reference in its entirety herein.

In embodiments, one or more of the array tips, backing layer, and rigid support are at least translucent, and preferably transparent.

The tip arrays are non-cantilevered and comprise tips which can be designed to have any shape or spacing between them, as needed. The shape of each tip can be the same or different from other tips of the array. Contemplated tip shapes include spheroid, hemispheroid, toroid, polyhedron, cone, cylinder, and pyramid (trigonal or square). The sharpness of the tip is measured by its radius of curvature, and the radius of curvature of the tips disclosed herein is below 1 μm. The tip array can be formed from a mold made using photolithography methods, which is then used to fashion the tip array using a polymer as disclosed herein. The mold can be engineered to contain as many tips arrayed in any fashion desired. The tips of the tip array can be any number desired, and contemplated numbers of tips include about 1000 tips to about 15 million tips, or greater.

The polymers can be any polymer having a compressibility compatible with the lithographic methods. Polymeric materials suitable for use in the tip array can have linear or branched backbones, and can be cross-linked or non-cross-linked, depending upon the particular polymer and the degree of compressibility desired for the tip. Cross-linkers refer to multi-functional monomers capable of forming two or more covalent bonds between polymer molecules. Non-limiting examples of cross-linkers include such as trimethylolpropane trimethacrylate (TMPTMA), divinylbenzene, di-epoxies, tri-epoxies, tetra-epoxies, di-vinyl ethers, tri-vinyl ethers, tetra-vinyl ethers, and combinations thereof.

Thermoplastic or thermosetting polymers can be used, as can cross-linked elastomers. In general, the polymers can be porous and/or amorphous. A variety of elastomeric polymeric materials is contemplated, including polymers of the general classes of silicone polymers and epoxy polymers. Polymers having low glass transition temperatures such as, for example, below 25° C. or more preferably below −50° C., can be used. Diglycidyl ethers of bisphenol A can be used, in addition to compounds based on aromatic amine, triazine, and cycloaliphatic backbones. Another example includes Novolac polymers. Other contemplated elastomeric polymers include methylchlorosilanes, ethylchlorosilanes, and phenylchlorosilanes, polydimethylsiloxane (PDMS). Other materials include polyethylene, polystyrene, polybutadiene, polyurethane, polyisoprene, polyacrylic rubber, fluorosilicone rubber, and fluoroelastomers.

Further examples of suitable polymers that may be used to form a tip can be found in U.S. Pat. Nos. 5,776,748; 6,596,346; and 6,500,549, each of which is hereby incorporated by reference in its entirety. Other suitable polymers include those disclosed by He et al., *Langmuir* 2003, 19, 6982-6986; Donzel et al., *Adv. Mater.* 2001, 13, 1164-1167; and Martin et al., *Langmuir,* 1998, 14-15, 3791-3795. Hydrophobic polymers such as polydimethylsiloxane can be modified either chemically or physically by, for example, exposure to a solution of a strong oxidizer or to an oxygen plasma.

The material used to form the tip array has a suitable compression modulus and surface hardness to prevent collapse of the tip during contact with the surface, but too high a modulus and too great a surface hardness can lead to a brittle material that cannot adapt and conform to a substrate surface during exposure. As disclosed in Schmid, et al., *Macromolecules,* 33:3042 (2000), vinyl and hydrosilane prepolymers can be tailored to provide polymers of different modulus and surface hardness. Thus, in another type of embodiment, the polymer can be a mixture of vinyl and hydrosilane prepolymers, wherein the weight ratio of vinyl prepolymer to hydrosilane crosslinker is about 5:1 to about 20:1.

The material used to form the tip array preferably will have a surface hardness of about 0.2% to about 3.5% of glass, as measured by resistance of a surface to penetration by a hard sphere with a diameter of 1 mm, compared to the resistance of a glass surface (as described in Schmid, et al., *Macromolecules,* 33:3042 (2000) at p 3044). The surface hardness optionally can be about 0.3% to about 3.3%, about 0.4% to about 3.2%, about 0.5% to about 3.0%, or about 0.7% to about 2.7% of glass. The polymers of the tip array can have a compression modulus of about 10 MPa to about 300 MPa. The tip array preferably comprises a compressible polymer which is Hookean under pressures of about 10 MPa to about 300 MPa. The linear relationship between pressure exerted on the tip array and the feature size allows for control of the near field and feature size using the disclosed methods and tip array.

The tip array can comprise a plurality of tips fixed to a common substrate and formed from a polymer as disclosed herein. The tips can be arranged randomly or in a regular periodic pattern (e.g., in columns and rows, in a circular pattern, or the like). The tips can all have the same shape or be constructed to have different shapes. The common substrate can comprise an elastomeric layer, which can comprise the same polymer that forms the tips of the tip array, or can comprise an elastomeric polymer that is different from that of the tip array. The elastomeric layer can have a thickness of about 50 μm to about 100 μm. The tip array can be affixed or adhered to a rigid support (e.g., glass, such as a glass slide). In various cases, the common substrate, the tip array, and/or the rigid support, if present, is translucent or transparent. In a specific case, each is translucent or transparent.

Methods of Forming 3D Objects

Figure 10:
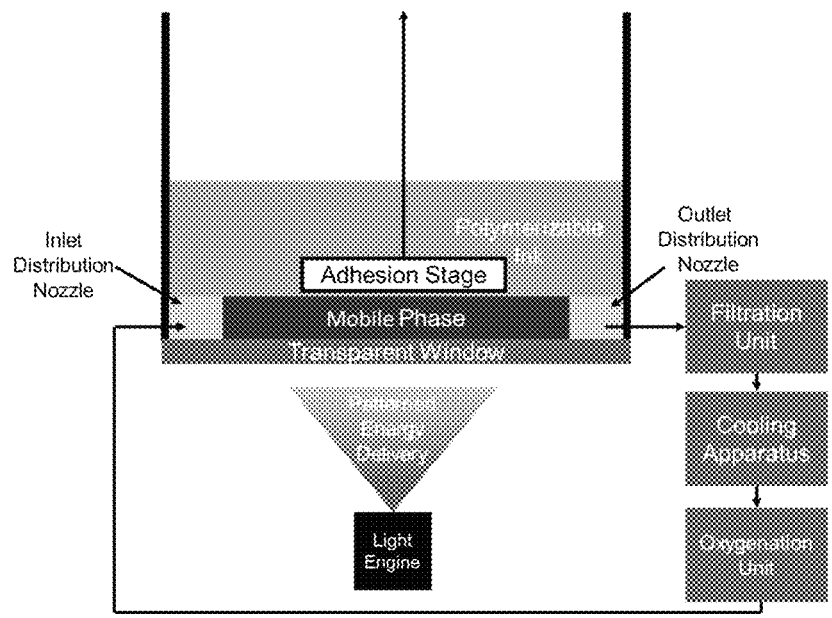
FIG. 10 is a side schematic view of one embodiment of an apparatus carrying out a method as disclosed herein, in particular an apparatus having a transparent member (transparent window), a dewetting material (mobile phase) provided on the transparent member, a polymerization liquid (polymerizable ink) provided on the dewetting material, and an adhesion stage, wherein the dewetting material is recirculated through a closed loop optionally including a filtration unit, cooling apparatus, and oxygenation unit (all shown).
Figure 11:
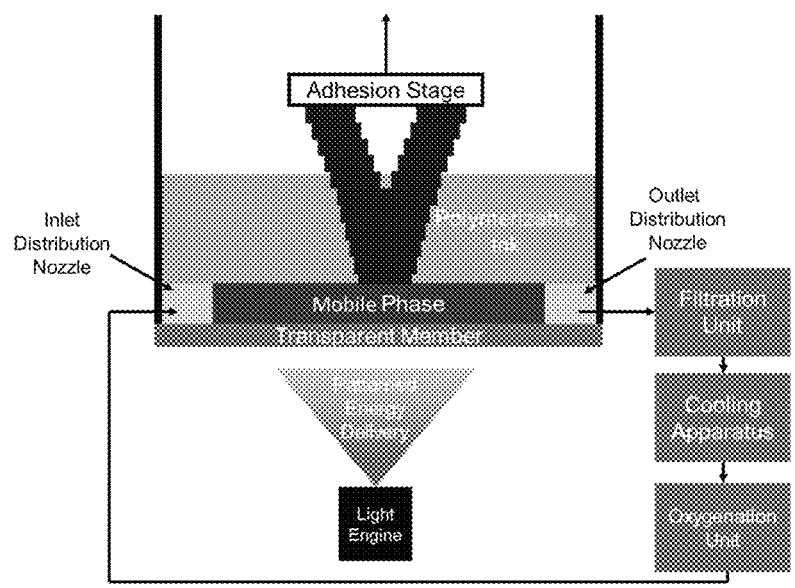
FIG. 11 is a side schematic view of one embodiment of an apparatus carrying out continuous polymerization having a flowing fluid dewetting material (mobile phase).
Figure 12:
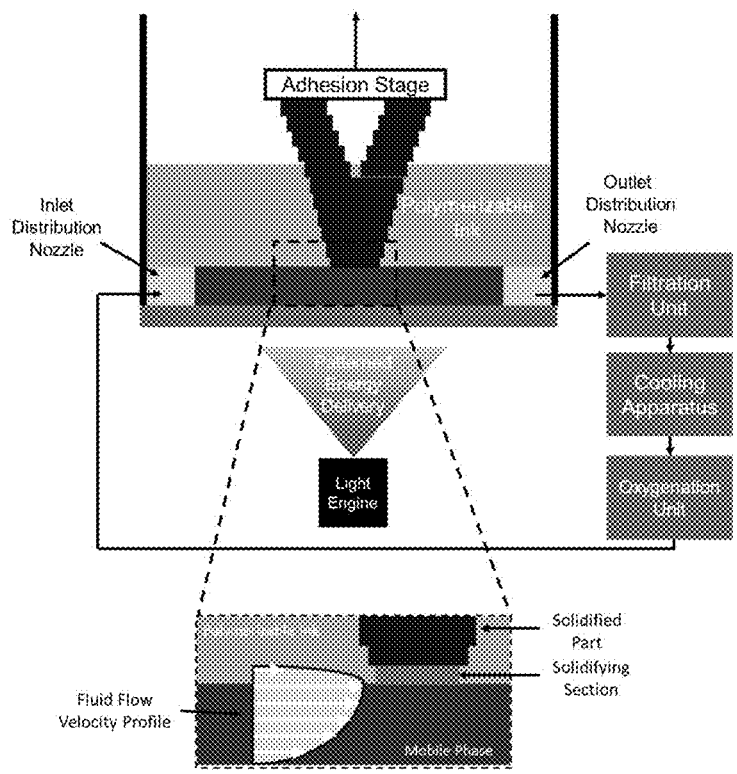
FIG. 12 is an expanded view of the fluid velocity profile at the build interface of the embodiment of the apparatus carrying out continuous polymerization as shown in FIG. 11.

In embodiments, once the polymerization liquid and the dewetting material are supplied together in a suitable apparatus, fabrication of the three dimensional object may commence, e.g., as shown in FIGS. 1-4. In embodiments, once the polymerization liquid and dewetting material are supplied together in a suitable apparatus, fabrication of the three dimensional object may commence, e.g., as shown in FIGS. 10-12. Fabrication is carried out continuously.

Figure 21A:
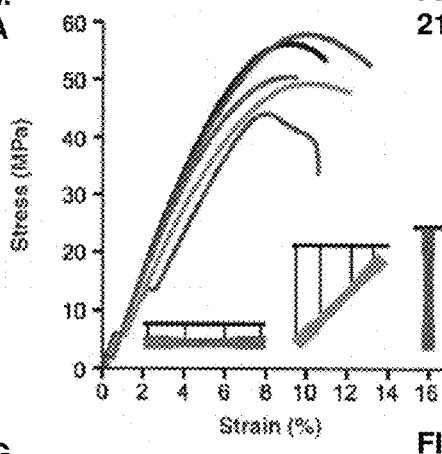
FIG. 21A is a reproduction of FIG. 18A.

Continuous printing advantageously allows for fabrication of objects having isotropic mechanical properties. The isotropic mechanical properties result from uniform cross-links and polymer chain entanglements that transcend 2D layers represented by slices prepared from traditional layer-by-layer printing. For this reason, traditional layer-by-layer systems, such as SLA and FDM, often yield parts with anisotropic properties that are dependent upon the print orientation, as shown in FIG. 18B. Alternatively, systems which print continuously in the z-direction, such as CLIP and the methods of the disclosure, tend to demonstrate isotropic material properties, as shown in FIG. 18A and FIG. 21A. Continuous print mechanisms, which do not lift the part away from the interface between each "slice", require the polymerization liquid be replenished between the printed part and the interface with the dewetting material. The rate of the polymerization liquid flow into the build region depends on both the viscosity of the polymerization liquid and the cross-section of the printed object (the higher the viscosity, the slower the flow of the polymerization liquid; the larger the cross-section the further the polymerization liquid must travel). The flow dynamics of the polymerization liquid can give rise to a cosmetic surface roughness/ridging on the parts produces.

Advancing the adhesion stage away from the build surface encompasses embodiments wherein the adhesion stage is advanced up and away from a stationary build surface and/or embodiments wherein the adhesion stage is fixed and the build surface is lowered to thereby advance the adhesion stage away therefrom. Advancing the adhesion stage away from the build surface can further encompass moving the adhesion stage toward the build surface, e.g., in a reciprocating motion, provided that the net movement of the adhesion stage is away from the build surface.

In some embodiments, the advancing step is carried out sequentially in uniform increments (e.g., of from 0.1 or 1 microns, up to 10 or 100 microns, or more) for each step or increment. In some embodiments, the advancing step is carried out sequentially in variable increments (e.g., each increment ranging from 0.1 or 1 microns, up to 10 or 100 microns, or more) for each step or increment. The size of the increment, along with the rate of advancing, will depend in part upon factors such as temperature, pressure, structure of the article being produced (e.g., size, density, complexity, configuration, etc.).

In some embodiments, the advancing step is carried out continuously, at a uniform or variable rate. Note that fabrication of the product may be continuous (as opposed to layer-by-layer) even when the advancing step is carried out in increments.

In some embodiments, the rate of advance (whether carried out sequentially or continuously) is from about 0.1, 1, or 10 microns per second, up to about to 100, 1,000, or 10,000 microns per second, again depending again depending on factors such as temperature, pressure, structure of the article being produced, intensity of radiation, etc. In embodiments, the arm sustaining the adhesion stage and, thereby, the print, is retracted away from the build surface at a constant rate of about 10 microns, or about 30 microns per second up to about 200 microns, about 180 microns, about 160 microns, about 140 microns, or about 120 microns per second, thereby advancing the adhesion stage away from the build surface at a constant rate of about 10 microns per second to about 200 microns per second. In embodiments, the print is retracted away from the build surface at a rate in a range of about 100 microns per second to about 140 microns per second, for example, 120 microns per second.

In embodiments, advancing the adhesion stage away from the build surface comprises advancing the adhesion stage away from the build surface at a constant rate. In embodiments, advancing the adhesion stage away from the build surface comprises advancing the adhesion stage away from the build surface at a variable rate. In embodiments, advancing the adhesion stage away from the build surface can comprise advancing the adhesion stage away from the build surface at a constant rate for a fixed distance and is then paused for a fixed amount of time, and optionally repeated. In some cases, advancing the adhesion stage away from the build surface can comprise advancing the adhesion stage away from the build surface at a variable rate for a fixed distance and is then paused for a fixed amount of time, and optionally repeated. The cycle of advancing the adhesion stage away from the build surface for a fixed distance followed by a pause for a fixed amount of time can provide an effective retraction rate (the total retraction displacement over the full time of the pull-pause cycle) of about 10 microns per second to about 200 microns per second, about 30 microns per second to about 120 microns per second, or about 100 microns per second to about 140 microns per second.

In some cases, advancing the adhesion stage away from the build surface comprises advancing the adhesion stage away from the build surface in a reciprocating manner. For example, advancing the adhesion stage away from the build surface in a reciprocating manner comprises a cycle comprising (i) advancing the adhesion stage away from the build surface and (ii) advancing the adhesion stage back toward the build surface. The advancing the adhesion stage away from the build surface in a reciprocating manner can further comprise pausing the adhesion stage between advancing the adhesion stage away from the build surface and advancing the adhesion stage back toward the build surface. The advancing the adhesion stage away from the build surface in an reciprocating manner can further including pausing the adhesion stage after advancing the adhesion stage back toward the build surface. The effective retraction rate (the total retraction displacement made over the full time of an oscillating cycle) can be in a range of about 10 microns per second to about 200 microns per second, about 15 microns per second to about 120 microns per second, about 30 microns per second to about 120 microns per second, or about 100 microns per second to about 140 microns per second.

A layering/ridging effect has been found to occur in known bottom-up printing system as a result of the dewetting material moving up and pinching off as the printed part advances away. It is believed that the moving up and pinching off of the dewetting material is caused by a combination of interfacial adhesive forces between the materials and the cavitation force formed when the printed part moves away from the interface of the dewetting material and the polymerization liquid. Without intending to be bound by theory, it is believed that the layering effect can be mitigated by advancing the adhesion stage away from the build surface in a reciprocating manner. For example, advancing the adhesion stage away from the build surface by 500 microns, followed by 450 microns back toward the build surface (thus having a net displacement of 50 microns away from the build surface). It is believed that the large fast lift breaks the dewetting material adhesion from the solidified object and thus reduces the surface ridging because the increased force results in a faster pinch of. In another example, advancing the adhesion stage away from the build surface by 500 microns rapidly, followed by 520 microns back towards the interface rapidly, followed by the retraction of the adhesion stage away from the building surface by 50 microns slowly, thereby resulting in a net motion of 30 microns per cycle and net speeds of 120 microns per second. By compressing the previous object layer against the newly polymerizing object layer at the interface (i.e. the forward step of 500 microns followed by a reverse step of 520 microns), continuous cross-linking between layers can be achieved. The energy source can be projected continuously to ensure a continuous print. Optionally, the energy source can be intermittent to halt polymerization while the object is not substantially adjacent to the interface.

Advancing the adhesion stage away from the build surface can in some cases include a mixture of a continuous pull and reciprocating cycles. Without intending to be bound by theory, a continuous pull (having a constant or variable rate) can be used at the beginning of a print to reduce disruption of the print interface that may occur from a reciprocating cycle while the adhesion stage is immersed in the polymerization liquid. Thus, a reciprocating cycle may be initiated after the adhesion stage has been advanced away from the build surface such that the adhesion stage is no longer immersed in the polymerization liquid.

The vertical print speed of the methods of the disclosure is not particularly limited and can be in a range of, for example, about 10 μm/s to about 300 μm/s. In embodiments the vertical print speed is at least about 10 μm/s, at least about 20 μm/s, at least about 50 μm/s, at least about 90 μm/s, or at least about 120 μm/s, and up to about 300 μm/s, up to about 260 μm/s, up to about 240 μm/s, or up to about 180 μm/s, for example, about 20 μm/s, about 30 μm/s, about 40 μm/s, about 50μ,m/s, about 60 μm/s, about 70 μm/s, about 80 μm/s, about 90 μm/s, about 100 μm/s, about 120 μm/s, about 150 μm/s, about 180 μm/s, about 200 μm/s, about 240 μm/s, about 260 μm/s, about 280 μm/s, or about 300 μm/s. In embodiments, the vertical print speed can be in a range of about 50 μm/s to about 150 μm/s, about 90 μm/s to about 150 μm/s, about 90 μm/s to about 270 μm/s, or about 120 μm/s to about 240 μm/s.

In some embodiments the providing a polymerization liquid step is carried out by forcing the polymerization liquid into the build region under pressure. In such a case, the advancing step or steps may be carried out at a rate or cumulative or average rate of at least 0.1, 1, 10, 50, 100, 500 or 1000 microns per second, or more. In general, the pressure can be the pressure sufficient to increase the rate of said advancing step(s) at least 2, 4, 6, 8 or 10 times as compared to the maximum rate of repetition of said advancing steps in the absence of said pressure. Where the pressure is provided by enclosing an apparatus in a pressure vessel and carrying the process out in a pressurized atmosphere (e.g., of air, air enriched with nitrogen, a blend of gases, etc.) a pressure of 10, 20, 30 or 40 pounds per square inch (PSI) up to, 200, 300, 400 or 500 PSI or more, may be used. For fabrication of large irregular objects higher pressures may be less preferred as compared to slower fabrication times due to the cost of a large high pressure vessel.

On the other hand, when smaller items are fabricated, or a rod or fiber is fabricated that can be removed or exited from the pressure vessel as it is produced through a port or orifice therein, then the size of the pressure vessel can be kept smaller relative to the size of the product being fabricated and higher pressures can (if desired) be more readily utilized.

The flowing of the dewetting material across the member creates a shear force at the interface between the object being printed and the dewetting material, which can facilitate pulling polymerization liquid into the build region, facilitating replenishment of depleted zones of polymerization liquid generated as a green part is extracted, allowing for increased resolution of the emergent object.

Figure 16:
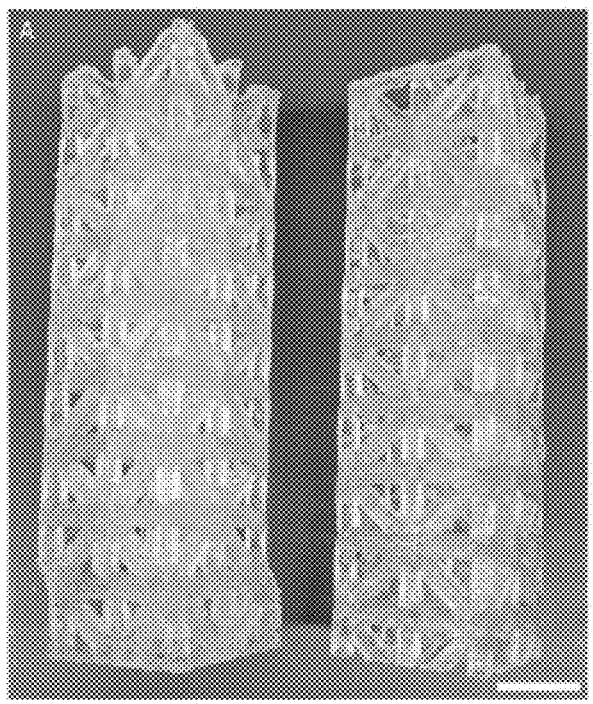
FIG. 16 is a photo of two printed parts. On the left, a 3D printed part in which thermal control is lost near the base of the part. On the right, the same 3D part with the added benefit of dewetting material flow and cooling to dissipate heats resulted in thermal control being maintained and lateral resolution of the printed part being maintained. Parts were printed with a hard urethane acrylate resin, a monochromatic UV source (100 micron optical resolution), and a TPO photoinitiator. Scale bar is 50 mm.

The methods disclosed herein can further include cooling at least one of the member, dewetting material, and the polymerization liquid, or any combination thereof. The cooling of at least one of the member, dewetting material, and polymerization liquid can be achieved using a cooling apparatus, as described herein. In some embodiments, the cooling apparatus is optically transparent. As shown in FIG. 20, in the absence of heat removal, rapid vertical print speeds of even modestly sized parts quickly exceeds the smoke point of the resin. Extreme temperature swings ($\Delta T>120°$ C.) result in variable reactivities across the build region, thermal warping/cracking of the printed material, and uncontrolled clouding that limits lateral resolution; ultimately these factors result in a deformed object and failed print (FIG. 16). One of the challenges in the SLA space is that when the polymer resin begins to overheat, 'clouding' occurs. Clouding is the polymerization of free-floating micro-particles. These particles are at a size domain (2-20 μm) where they are sufficiently large enough to scatter light, thus control of the optical resolution of the system and of the printed object. For this reason, many traditional SLA printers utilize a wiper to clear particulates after each irradiation step (e.g., Formlabs' Form 2 printer). As thermal control is lost, clouding becomes an even greater problem—the result is that the UV-projected cross-section begins to blur. This optical blurring results in a 'fuzzy' 3D printed part. An example of this can be seen in FIG. 16. In embodiments, the temperature of the dewetting material, the polymerization liquid, green polymer, or a combination thereof does not exceed 150° C. In embodiments, the temperature of the dewetting material, the polymerization liquid, green polymer, or a combination thereof does not exceed 120° C. In embodiments, the maximum temperature of the dewetting material, the polymerization liquid, the green polymer, or a combination there of is in a range of about 100° C. to 120° C.

In embodiments, the dewetting material is cooled. In embodiments, cooling the dewetting material can include allowing heat to dissipate into a dewetting material reservoir by recirculating the dewetting material through the reservoir. In embodiments, cooling the dewetting material can include passing the dewetting material through a heat exchanger.

The irradiating step is in some embodiments carried out with patterned irradiation. The patterned irradiation may be a fixed pattern or may be a variable pattern created by a pattern generator (e.g., a DLP, LCD, etc.) as discussed below, depending upon the particular item being fabricated.

When the patterned irradiation is a variable pattern rather than a pattern that is held constant over time, then each irradiating step may be any suitable time or duration depending on factors such as the intensity of the irradiation, the presence or absence of dyes in the polymerization liquid, the rate of growth, etc. Thus in some embodiments each irradiating step can be from 0.001, 0.01, 0.1, 1 or 10 microseconds, up to 1, 10, or 100 minutes, or more, in duration. The interval between each irradiating step is in some embodiments preferably as brief as possible, e.g., from 0.001, 0.01, 0.1, or 1 microseconds up to 0.1, 1, or 10 seconds.

The exposing the polymerization liquid in the build region to energy can include irradiating the build region with an energy source. Contemplated energy sources include electrical, chemical, magnetic, electromagnetic, photonic, acoustic, heating, and combinations thereof. In embodiments, the polymerization is performed by electromagnetic irradiation, electricity, thermal activation, magnetic activation, or a combination thereof. Thus, one or more components of a suitable apparatus of the disclosure, including, but not limited to, the member, dewetting material, and/or cooling apparatus can be optically transparent and/or can allow transduction or transmission of energy provided by an energy source (e.g., electrical, chemical, magnetic, electromagnetic, photonic, acoustic, heating, and combinations thereof).

The methods disclosed herein can further include filtering, cleaning, and/or decontaminating the dewetting material. Generation of small light-scattering particles of polymerized ink can cause clouding of the dewetting material, which can cause a loss in lateral resolution in a print and require replacement of the interface after a certain number of prints. Filtering, cleaning, and/or decontaminating the dewetting material can remove the small scattering particles to reduce clouding and maintain suitable lateral resolution over a long print or multiple prints.

Clouding of the dewetting material can further be reduced by cooling the dewetting material, such as by incorporating a cooling apparatus to minimize over-heating at the interface caused by exothermic polymerization reactions. The cooling apparatus can cool the dewetting material, which can in turn cool the build region at the interface of the dewetting material and the polymerization liquid. In embodiments, cooling the dewetting material comprises passing the dewetting material through a cooling apparatus. In embodiments, cooling the dewetting material is via a heat exchanger that spans the build region.

The methods disclosed herein can further include oxygenating the dewetting material. Without intending to be bound by theory, it is believed that increasing the oxygen concentration in the dewetting material can further reduce interfacial surface adhesions. In contrast to known methods relying on diffusion of oxygen through a membrane, oxygenating the dewetting material advantageously actively transports inhibitors to a location in a controlled fashion, as opposed to relying upon passive diffusion.

The methods disclosed herein can further be performed in an oxygen-free environment. For example, when the printing apparatus is provided in a closed system, the oxygen can be removed from the system and replaced with an inert gas such as argon or nitrogen.

Apparatus for Forming 3D Objects

Another aspect of the disclosure provides an apparatus for forming a three-dimensional object from a polymerization liquid, the apparatus including: a support; an adhesion stage operatively associated with the support on which adhesion stage the three-dimensional object is formed; a member having a length direction and a width direction, the member having a layer of a dewetting material thereon, the dewetting material having a build surface, with the build surface and adhesion stage defining a build region therebetween; an inlet manifold provided on the member at one end of the length of the member, the inlet manifold having a distribution nozzle in fluid communication with the dewetting material, the distribution nozzle comprising a plurality of individual fluid outlet nozzles spaced across the width direction of the member such that a uniform flow of dewetting material can be provided across the length direction of the member; an outlet manifold provided on the member at the end of the length of the member distal from the inlet manifold, the outlet manifold having a collection nozzle in fluid communication with the dewetting material and in fluid communication with the inlet to provide a recirculation loop and allow for a flow of dewetting material across the member, the collection nozzle comprising a plurality of individual fluid input nozzles spaced across the width direction of the member, the build region being between the inlet manifold and the outlet manifold; a dewetting material reservoir optionally provided along the recirculation loop between the outlet and the inlet configured to supply dewetting material into the build region and dissipate heat from the circulating dewetting fluid; a polymerization liquid supply operatively associated with the build surface and configured to supply polymerization liquid into the build region; an energy source configured to deliver a pattern of energy to the build region through the member and the dewetting material to form a green polymer from the polymerization liquid; at least one controller operatively associated with the energy source for delivering the pattern of energy to the build region, the at least one controller also operatively associated with the adhesion stage for advancing the adhesion stage away from the build surface at a rate that is dependent on energy intensity to form the three-dimensional object, and the at least one controller also operatively associated with the recirculation loop configured to maintain the flow of the dewetting material across the member.

The methods of the present disclosure can be implemented with a variety of different apparatus. In the simplest embodiment, an apparatus as shown in FIG. 1 herein is employed. In brief overview, such an apparatus includes a vessel comprising an optically transparent member (window) for containing a dewetting material, with a polymerization liquid provided on top of the dewetting material. The window is positioned at the bottom of the vessel, through which energy may be delivered to the build region to polymerize the polymerization liquid. An adhesion stage is positioned over the vessel which gradually and progressively advances the growing three-dimensional object up and out of the polymerization liquid. At least one controller (e.g., a computer with appropriate interface and program) may be provided (not shown), which operates the adhesion stage and, optionally, a cooling apparatus, e.g., responsive to data such as current temperature of the dewetting material as determined by a temperature sensor. Additional and alternative features of the apparatus, and the operation thereof, are discussed further below.

Figure 14:
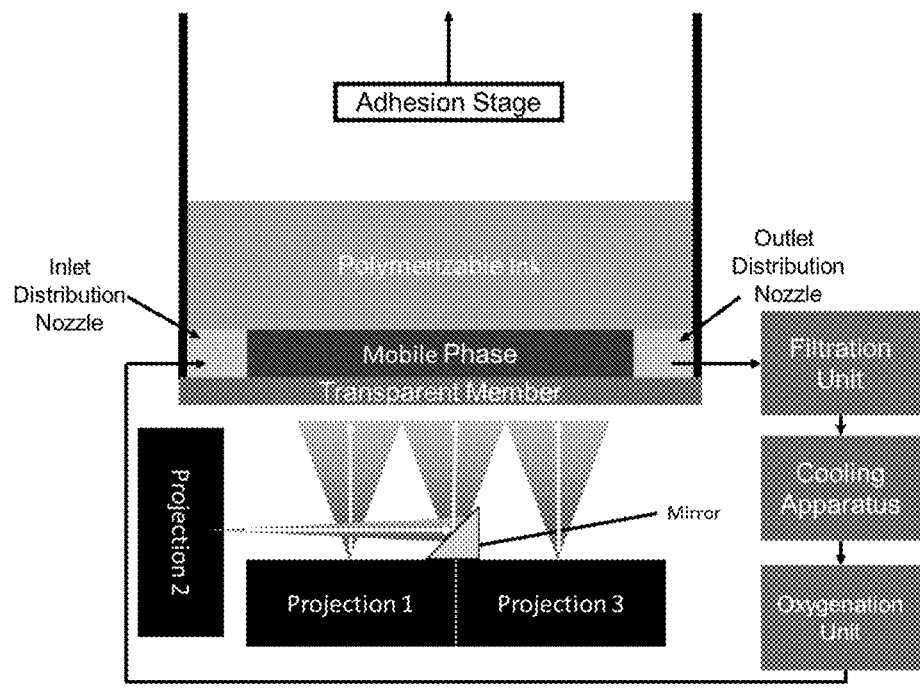
FIG. 14 is a side schematic view of one embodiment of an apparatus useful for carrying out a method as disclosed herein, in particular by using a multiple projection light engine.
Figure 15:
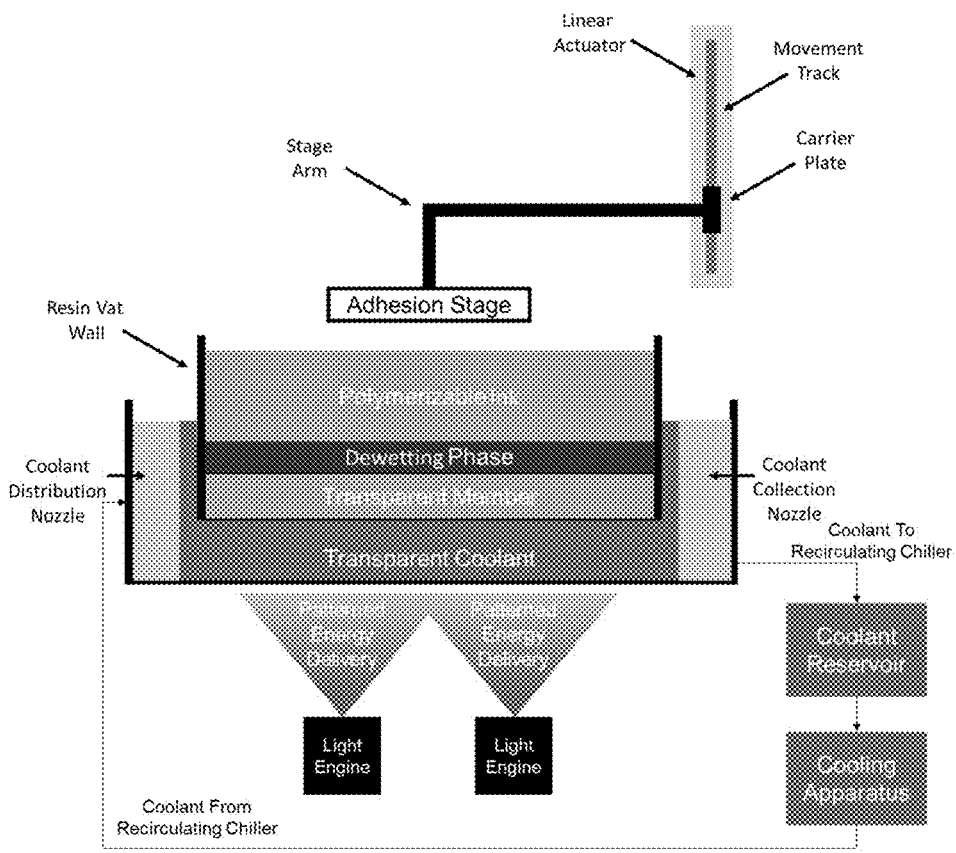
FIG. 15 is a side schematic view of one embodiment of an apparatus useful for carrying out a method as disclosed herein, particularly through the combination of multiple light engines, a transparent cooling apparatus, a transparent member with a dewetting material (dewetting phase) thereon, polymerization liquid (polymerizable ink), and an adhesion stage, wherein the motion of the adhesion stage is dictated by a computer controlled linear actuator.

Numerous variations on the apparatus described in FIG. 1 above can be employed. For example, energy may be supplied through a window positioned at the bottom of the dewetting material as illustrated in FIG. 1, through the side of the dewetting material (e.g., aided by a mirror or mirror assembly within the dewetting material as shown in FIG. 14), may be achieved with an energy source positioned entirely within the polymerization liquid, may be achieved with a fiber optic or light pipe having a terminus within the polymerization liquid. In embodiments, the optically transparent member and dewetting material are attached to a fiber optic projector, and the fiber optic projector delivers the energy for polymerization.

In general, the member of the apparatus disclosed herein can be a support for the dewetting material. Optionally, the member is optically transparent. Optionally, the member allows transduction or transmission of energy provided by an energy source selected from the groups consisting of electrical, chemical, magnetic, electromagnetic, photonic, acoustic, heating, and combinations thereof. Optionally, the member is not oxygen permeable. As used herein "not oxygen permeable" means that the member transmits less than 5% by volume, less than 3% by volume, or less than 1% by volume of the oxygen contained in the atmosphere to which the member is exposed. The member can be prepared from glass, low-iron and high-transparence glass variants (commercially referred to as sapphire glass), quartz, sapphire, soda lime (BK7) acrylic, fused silica, fused quartz, germanium, borosilicate, silicon nitride, or combinations thereof, as determined by the wavelength of the energy source emerging from the light engine.

As noted above, because the methods of the disclosure allow for polymerization to occur without strong adhesive forces between the green polymer and the underlying dewetting material, the polymerization liquid does not require a dead zone. Accordingly, in embodiments, the apparatus does not include a dead zone or inhibition region.

In embodiments, the apparatus includes a cooling apparatus. In embodiments, the cooling apparatus comprises the dewetting material, which can cool the apparatus by removing heat from the build region as the dewetting material flows out of the build region, and allowing the heat to dissipate out of the dewetting material. In embodiments, the cooling apparatus comprises a heat exchanger. In refinements of the foregoing embodiment, the heat exchanger can be provided along the recirculation loop between the outlet and the inlet. In refinements of the foregoing embodiment, the cooling apparatus can comprise a heat exchanger that spans the entire span of the build region. For example, in embodiments, the cooling apparatus can include a cold bath provided between the energy source and the member and in thermal contact with the member, the cold bath spanning the build region. Optionally, the cooling apparatus is optically transparent. In embodiments, the cooling apparatus allows transduction or transmission of energy provided by an energy source selected from the group consisting of electrical, chemical, magnetic, electromagnetic, photonic, acoustic, heating, and combinations thereof. In embodiments, the cooling apparatus is operatively associated with at least one of the member, dewetting material, and/or polymerization liquid. In embodiments, the cooling apparatus is operatively associated with at least one of the member, dewetting material, and/or polymerization liquid.

The apparatus of the disclosure can further comprise an outlet in fluid communication with the dewetting material and an inlet in fluid communication with the dewetting material. In embodiments the inlet is further in fluid communication with a first, dewetting material supply reservoir and the outlet is further in fluid communication with a second, dewetting material capture reservoir, to allow a flow of dewetting material across the member. In alternative embodiments, the outlet is in fluid communication with the inlet to provide a recirculation loop and allow a flow of dewetting material across the member.

The apparatus of the disclosure can further include an outlet manifold having a collection nozzle in fluid communication with the dewetting material and comprising the outlet and a plurality of individual fluid input nozzles spaced across the width direction of the member, and an inlet manifold having a distribution nozzle in fluid communication with the dewetting material and comprising the inlet and a plurality of individual fluid outlet nozzles spaced across the width direction of the member. FIG. 5A is a top-down view of the member having a length direction and a width direction. As shown in FIG. 5A, the inlet distribution nozzle includes an inlet and a plurality of individual fluid outlets spaced across the width direction of the member. The distribution nozzle advantageously facilitates formation of a directionally uniform flow of dewetting phase across the member and build region, in the plane of the length direction of the member. The distribution nozzle further advantageously facilitates and uniform effective fluid velocity profile across the member and build region, in the plane of the length direction of the member. This flow profile ensures that the oil layer remains optically uniform across the build platform (i.e., no turbulence giving rise to optical distortions at the dewetting phase/polymerization liquid interface) and results in uniform interfacial-shear stress being applied to all green parts. As can be seen in FIG. 5A, the actual velocity of the dewetting material in the can vary in the plane of the length direction of the member, depending on the proximity to individual fluid outlets. The velocity profile of the dewetting material in the depth direction (i.e., between the interface with the green polymer and the interface with the member is generally parabolic, with decreased velocities near the green polymer and member and increased velocities near the center of the dewetting material, as can be seen in FIG. 6C. Due to the slip boundary, the velocity of the dewetting material infinitesimally close to the interface with the green polymer and the interface with the member is greater than zero.

In general, the build region is provided completely in the region between the inlet manifold and the outlet manifold when viewing the member from a top-down perspective. This configuration is shown in FIG. 5A.

In embodiments wherein the outlet is in fluid communication with the inlet to provide a recirculation loop, the recirculation loop can further include a filtration unit provided along the recirculation loop between the outlet and the inlet, the filtration unit operatively associated with at least one controller and configured to filter, clean, or decontaminate the dewetting material. The recirculation loop can further include a cooling apparatus along the recirculation loop between the outlet and the inlet, the cooling apparatus operatively associated with at least one controller and configured to control the temperature of at least one of the dewetting material or the polymerization liquid. The recirculation loop can further include an oxygenation unit along the recirculation loop between the outlet and the inlet, the oxygenation unit operatively associated with the at least one controller configured to control the amount of oxygen provided to the dewetting material. In some embodiments, the recirculation loop include a filtration unit, a cooling apparatus, and an oxygenation unit. In some embodiments the recirculation loop includes a filtration unit and a cooling apparatus, a filtration unit and an oxygenation unit, or a cooling apparatus and an oxygenation unit. In some embodiments, the recirculation loop includes a filtration unit. In some embodiments the recirculation loop includes a cooling apparatus. In some embodiments, the recirculation loop includes an oxygenation unit. In any embodiment wherein the recirculation loop comprises two or more of a filtration unit, cooling apparatus, and oxygenation unit, the filtration unit, cooling apparatus, and oxygenation unit can be provided in any order along the circulation loop, for example, in the order filtration unit, cooling apparatus, oxygenation unit; filtration unit, oxygenation unit, cooling apparatus; cooling apparatus, filtration unit, oxygenation unit; cooling apparatus, oxygenation unit, filtration unit; oxygenation unit, filtration unit, cooling apparatus; or oxygenation unit, cooling apparatus, filtration unit. In embodiments, the recirculation loop is operatively associated with at least one controller configured to maintain a continuous flow of dewetting material. Optionally, the flow of dewetting material is maintained at a constant rate.

A polymerization liquid reservoir, tubing, pumps liquid level sensors and/or valves can be included to replenish the pool of polymerization liquid (not shown), though in some embodiments a simple gravity feed may be employed. Drives/actuators for the adhesion stage, along with associated wiring, can be included in accordance with known techniques. The drives/actuators, energy source, and in some embodiments, pumps and liquid level sensors can all be operatively associated with a suitable controller. In embodiments wherein the dewetting material is flowed across the member, the pump can be any continuous flow pump, for example, a four lobe diaphragm pump. In general pumps that pulse, such a peristaltic pumps, are not suitable.

Any suitable energy source (or combination of sources) can be used in the apparatus, depending upon the particular polymerization liquid employed, including electron beam and ionizing radiation sources. In embodiments, the energy source is configured to provide energy to the build region through the member and the dewetting material to form a solid polymer from the polymerization liquid. In embodiments, the energy source is a light engine. The light engine transmits energy so as to initiate a polymerization event in a patterned and/or controlled manner. Examples of light patterning tools include digital mirror devices or liquid crystal displays (LCD). In embodiments, the light engine has a light source selected from the group consisting of a mercury light source, light emitting diodes (LED) source, halogen light, and laser. In embodiments, the energy source is a micro-electrode array. In embodiments, the energy source is a photoconductive material. In embodiments, the energy source is a magnetic flux. In embodiments, the energy source is selected from the group consisting of electrochemical, electromagnetic, photoconductor, acoustic, heating, a circuit, a photodiode, a grid area, and combinations thereof. In embodiments, the energy source is selected from the group consisting of electrical, chemical, magnetic, electromagnetic, photonic, acoustic, heating, and combinations thereof.

In embodiments, the energy source is an actinic radiation source, such as one or more light sources, and in particular one or more ultraviolet light sources. Any suitable light source can be used, such as incandescent lights, fluorescent lights, phosphorescent or luminescent lights, a laser, light-emitting diode, etc., including arrays thereof. The light source preferably includes a pattern-forming element operatively associated with the controller. In embodiments, the light source or pattern forming element comprises a digital (or deformable) micromirror device (DMD) with digital light processing (DLP), a spatial modulator (SLM), or a microelectromechanical system (MEMS) mirror array, a mask (aka a reticle), a silhouette, or a combination thereof. See, U.S. Pat. No. 7,902,526. Preferably the light source comprises a spatial light modulation array such as a liquid crystal light valve array or micromirror array or DMD (e.g., with an operatively associated digital light processor, typically in turn under the control of a suitable controller), configured to carry out exposure or irradiation of the polymerization liquid without a mask, e.g., by maskless photolithography. See, e.g., U.S. Pat. Nos. 6,312,134; 6,248,509; 6,238,852; and 5,691,541.

While in some embodiments the support on which the adhesion stage is mounted can be an elevator to advance up and away from a stationary build surface, in other embodiments the converse arrangement may be used. That is, the adhesion stage may be on a fixed support and the build surface lowered to thereby advance the adhesion stage away therefrom. Numerous different mechanical configurations will be apparent to those skilled in the art to achieve the same result, in all of which the build surface is "stationary" in the sense that no lateral (X or Y) movement is required or no elastic build surface that must be stretched and then rebound (with associated over-advance, and back-up of, the adhesion stage) need be employed. In embodiments, the adhesion stage is operatively associated with an actuation arm configured to advance the adhesion stage.

Depending on the choice of material from which the adhesion stage is fabricated, and the choice of polymerization liquid from which the article is made, adhesion of the article to the adhesion stage may sometimes be insufficient to retain the article on the adhesion stage through to completion of the finished article or "build." For example, an aluminum adhesion stage may have lower adhesion than a poly(vinyl chloride) (or "PVC") adhesion stage. Hence one solution is to employ an adhesion stage comprising a PVC on the surface to which the article being fabricated is polymerized. If this promotes too great an adhesion to conveniently separate the finished part from the adhesion stage, then any of a variety of techniques can be used to further secure the article to a less adhesive adhesion stage, including but not limited to the application of adhesive tape such as "Greener Masking Tape for Basic Painting #2025 High adhesion" to further secure the article to the adhesion stage during fabrication. Additionally, polymeric or metallic mesh material can be secured to the stage such that supports formed early in the print process polymerize around the mesh, embedding parts of the adhesion stage within the object itself.

Soluble sacrificial layers. In some embodiments, a soluble sacrificial layer or release layer may be established between the adhesion stage and the three-dimensional object, so that that sacrificial layer may be subsequently solubilized to conveniently release the three-dimensional object from the adhesion stage once fabrication is complete. Any suitable sacrificial layer, such as an adhesive, that may be coated or otherwise provided on the adhesion stage may be employed, and any suitable solvent (e.g., polar and non-polar organic solvents, aqueous solvents, etc. to solubilize the sacrificial release layer may be employed, though the sacrificial layer and its corresponding solvent should be chosen so that the particular material from which the three-dimensional object is formed is not itself unduly attacked or solubilized by that solvent. The sacrificial layer may be applied to the adhesion stage by any suitable technique, such as spraying, dip coating, painting, etc. Examples of suitable materials for the soluble sacrificial release layer (and non-limiting examples of corresponding solvents) include but are not limited to: cyanoacrylate adhesive (acetone solvent); poly(vinylpyrrolidone) (water and/or isopropyl alcohol solvent); lacquers (acetone solvent); polyvinyl alcohol, polyacrylic acid, poly (methacrylic acid), polyacrylamide, polyalkylene oxides such as poly(ethylene oxide), sugars and saccharides such as sucrose and dextran (all water or aqueous solvents); etc. Lower surface energy solvents are in some embodiments particularly preferred.

In some embodiments, the actuator/drive and/or associated controller are configured to only advance the adhesion stage away from the build region (e.g., is unidirectional). In some embodiments, the actuator/drive and/or associated controller are configured as a continuous drive (as opposed to a step-wise drive). The adhesion stage can be advanced away from the build stage at a constant rate or at a variable rate. In embodiments, the adhesion stage can be advanced away from the build stage in an oscillating manner.

A controller for use in carrying out the method of the disclosure may be implemented as hardware circuitry, software, or a combination thereof. In one embodiment, the controller is a general purpose computer that runs software, operatively associated with monitors, drives, pumps, and other components through suitable interface hardware and/ or software. Suitable software for the control of a three-dimensional printing or fabrication method and apparatus as described herein includes, but is not limited to, the ReplicatorG open source 3d printing program, 3DPrint™ controller software from 3D systems, Slic3r, Skeinforge, KISSlicer, Repetier-Host, PrintRun, Cura, etc., including combinations thereof.

Process parameters to directly or indirectly monitor, continuously or intermittently, during the process (e.g., during one, some or all of said filling, irradiating and advancing steps) include, but are not limited to, energy intensity, temperature of adhesion stage, polymerization liquid in the build zone, temperature of growing product, temperature of dewetting material, pressure, speed of advance, pressure, strain (e.g., exerted on the adhesion stage by the growing product being fabricated), thickness of release layer, etc.

Known parameters that may be used in feedback and/or feed-forward control systems include, but are not limited to, expected consumption of polymerization liquid (e.g., from the known geometry or volume of the article being fabricated), degradation temperature of the polymer being formed from the polymerization liquid, etc.

Process conditions to directly or indirectly control, continuously or step-wise, in response to a monitored parameter, and/or known parameters (e.g., during any or all of the process steps noted above), include, but are not limited to, rate of supply of polymerization liquid, temperature, pressure, rate or speed of advance of adhesion stage, intensity of energy provided, duration of energy provided (e.g. for each "slice"), etc.

For example, the temperature of the polymerization liquid in the build zone, or the temperature of the dewetting material, can be monitored, directly or indirectly with an appropriate thermocouple, non-contact temperature sensor (e.g., an infrared temperature sensor), or other suitable temperature sensor, to determine whether the temperature exceeds the degradation temperature of the polymerized product. If so, a process parameter may be adjusted through a controller to reduce the temperature in the build zone and/or of the dewetting material. Suitable process parameters for such adjustment may include: decreasing temperature with a cooling apparatus, decreasing the rate of advance of the adhesion stage, decreasing intensity of the energy provided, decreasing duration of energy provided, etc.

In addition, the intensity of the energy source (e.g., an ultraviolet light source such as a mercury lamp) may be monitored with a photodetector to detect a decrease of intensity from the irradiation source (e.g., through routine degradation thereof during use). If detected, a process parameter may be adjusted through a controller to accommodate the loss of intensity. Suitable process parameters for such adjustment may include: increasing temperature with a heater, decreasing the rate of advance of the adhesion stage, increasing power to the light source, etc.

As another example, control of temperature and/or pressure to enhance fabrication time may be achieved with heaters and coolers (individually, or in combination with one another and separately responsive to a controller), and/or with a pressure supply (e.g., pump, pressure vessel, valves and combinations thereof) and/or a pressure release mechanism such as a controllable valve (individually, or in combination with one another and separately responsive to a controller).

In embodiments wherein the energy source is a light, the speed of fabrication can increase with increased light intensity. In some embodiments, the light is concentrated or "focused" at the build region to increase the speed of fabrication. This may be accomplished using an optical device such as an objective lens. The speed of fabrication may be generally proportional to the light intensity. For example, the build speed in millimeters per hour may be calculated by multiplying the light intensity in milliWatts per square centimeter and a multiplier. The multiplier may depend on a variety of factors, including those discussed below. A range of multipliers, from low to high, may be employed. On the low end of the range, the multiplier may be about 10, 15, 20 or 30. On the high end of the multiplier range, the multiplier may be about 150, 300, 400 or more.

Certain optical characteristics of the light may be selected to facilitate increased speed of fabrication. By way of example, a band pass filter may be used with a mercury bulb light source to provide 365±10 nm light measured at Full Width Half Maximum (FWHM). By way of further example, a band pass filter may be used with an LED light source to provide 375±15 nm light measured at FWHM.

As noted above, polymerization liquids used in such processes can be free radical polymerization liquids, or acid-catalyzed or cationically polymerization liquids. Some specific polymerization liquids will of course cure more rapidly or efficiently than others and hence be more amenable to higher speeds, though this may be offset at least in part by further increasing light intensity.

In general, lower viscosity polymerization liquids are more amenable to higher speeds, particularly for fabrication of articles with a large and/or dense cross section (although this can be offset at least in part by increasing light intensity). Polymerization liquids with viscosities in the range of 50 or 100 centipoise, up to 600, 800 or 1000 centipoise or more (as measured at 25° C. and atmospheric pressure with a suitable device such as a HYDRAMOTION REACTAVISC™ Viscometer (available from Hydramotion Ltd, 1 York 25 Road Business Park, Malton, York YO17 6YA England). In some embodiments, where necessary, the viscosity of the polymerization liquid can advantageously be reduced by heating the polymerization liquid.

The energy cure response of the polymerization liquid and depth of light penetration into the resin are parameters that control formation of the green polymer. These parameters can be measured using the protocol documented by Joe Bennett of the National Institute of Standards and Technology (NIST, Gaithersburg, MD, USA). In brief, the penetration of UV light being projected into the pool of polymerization liquid can be described by the Beer-Lambert relationship:

$$P(z) = P_o \cdot \exp[-z/D_p]$$

where P is the UV power (mW/cm$^2$) at some depth, z (μm), away from the print interface, $P_o$ is the power at the interface where z=0 μm, and $D_p$ (μm) is the characteristic distance parameter describing how the intensity of light decreases as it enters the pool of polymerization liquid. From this relationship, we can rearrange to solve for the Jacobs' working curve equation:

$$C_d = D_p \cdot \ln(E_o/E_c)$$

where $C_d$ is the cure depth (or thickness of solidified resin, μm), $E_o$ is the energy of UV light delivered at the interface (i.e., $E_o = \int P_o dt$; mJ/cm$^2$), and $E_c$ is the critical energy of UV light (mJ/cm$^2$) that must be delivered to cause a solidification of polymerization liquid at some corresponding depth $C_d$.

With the working curve equation, one can now expose polymerization liquid on a glass substrate to a known amount of UV light from the UV source of interest and then measure the resulting height of the cured part, $C_d$, using a caliper. A series of data points corresponding to different exposure times (and thus different values of $E_o$) can be plotted and fit to a logarithmic curve using a non-linear least-squares solver to yield the constants $E_c$ and $D_p$ specific to the polymerization liquid chemistry and the optical system being tested.

The polymerization liquid chemistries of the methods of the disclosure can have low $E_c$ values ranging between 10-30 mJ/cm² and penetration depths, $D_p$, ranging between 300 to 800 μm. It was found that, a polymerization liquid with an $E_c$ value between 10-20 mJ/cm² can be successfully printed at vertical print rates of 120 μm/s (lower $E_c$ corresponds with higher chemical reactivity and stronger photoresponse). Less reactive polymerization liquids with a higher $E_c$ value between 20-30 mJ/cm² can be successfully printed at vertical print rates ranging between 50-70 μm/s depending on the penetration depth. The $E_c$ and $D_p$ can be tuned and optimized with a combination of photo-initiators and blockers (if needed). Typically, increasing photo-initiator concentrations will decrease $E_c$ and $D_p$ at the same time. If one wishes to decrease $D_p$ without decreasing $E_c$, a wavelength appropriate blocker (e.g., anthracene) can be used to limit the light penetration.

The fluid flow dynamics of polymerization liquid in all continuous-print SLA machines are complex and difficult to describe analytically. Both the method of the disclosure and the CLIP method develop thin-liquid zones in which replenishment polymerization liquid can flow to reach the underside of an emerging green part. In the case of CLIP, there is a thin oxygen 'dead-layer' (between 20 to 80 μm for when air is supplied under the oxygen permeable film) which allows for the polymerization liquid to flow underneath the part—eventually, viscosity of the polymerization liquid flowing through this thin zone limits the vertical print rate and cross-sectional area allowed for an emerging part. In the case of the method of the disclosure, there is no oxygen depletion zone. Rather, there is a "cure-zone" in which the polymerization liquid has not received a sufficient number of photons necessary to be solidified from a liquid to a solid. Within this zone, fluid can continue to flow under the emerging part and the thickness of this zone and the viscosity of the polymerization liquid will limit the vertical print rate and cross-sectional area allowed for an emerging part. The thickness of this cure-zone is a function of the photo-response, vertical print speed, and the fluid flow dynamics. It was found that polymerization liquids having a liquid cure-zone of about 200 micron in height allow for an ideal print when the viscosity of the polymerization liquid remains below 400 cP. Thus, in embodiments, the polymerization liquid can have a cure-zone of about 200 micron. In embodiments, the polymerization liquid can have a viscosity of less than 400 cP and a cure-zone of about 200 micron.

The cure-zone can be approximated by considering a differential amount of polymerization liquid (with a given unit area and a differential height) being retracted from the print interface at a vertical speed of $v_z$. Assuming that the system is operating in a steady state configuration and the continuity of flow dynamics are such that polymerization liquid is continuously being replaced and incompressible, the vertical speed of the polymerization liquid moving away from the interface is roughly that of the vertical print speed of the printed object emerging from the vat. As this differential thickness of polymerization liquid moves away from the interface, it is receiving differing intensities of UV light (as it moves away from the interface, replacement polymerization liquid begins to block the light from reaching the differential element under consideration), which contributes to a total received energy dosage to the unit element. The intensity at varying z-locations can be described by the Beer-Lambert relationship:

$$P(z)=P_o \cdot \exp[-z/D_p]$$

where P is the UV power (mW/cm²) at some depth, z (μm), away from the print interface, $P_o$ is the power at the interface where z=0 μm, and $D_p$ (μm) is the characteristic distance parameter describing how the intensity of light decreases as it enters the pool of polymerization liquid and whose measurement is described above. The energy dosage received by the differential element of polymerization liquid, E, is simply the integration of the energy delivery over the exposure time: $E=\int P dt$. Given the vertical print rate, the polymerization liquid's position as a function of time can be described as $z(t)=v_z t$. The resulting equation:

$$E=\int P_o \cdot \exp[-v_z t/D_p] dt$$

can be evaluated between the point when the polymerization liquid is at the interface, t=0, and some ultimate point in time where it is away from the interface, t=t. Integration and evaluation results in:

$$E=(D_p P_o / v_z)(1-\exp[-v_z t/D_p]).$$

Evaluating for when t→∞ provides the total amount of energy delivered to the element of polymerization liquid, $E_{total}=D_p P_o/v_z$, while it is emerging from the printer. This energy dosage will be related to the ultimate conversion of chemical bonds and green-strength of the emerging part as it comes off the printer. As described above, the critical energy $E_c$ is the minimum energy that must be delivered to an element of polymerization liquid to induce the transition between liquid and a solid. The height at which the polymerization liquid reaches this critical energy dosage, $z_c(t)=v_z t_c$, can be described as the top of the cure-zone at which there is solidification of the liquid.

$$E_c=(D_p P_o/v_z)(1-\exp[-z_c/D_p])$$

$$z_c=D_p \cdot \ln[1-(E_c v_z)/(D_p P_o)]$$

The above relationship allows us to estimate the thickness of the cure-zone, in which the polymerization liquid remains a liquid flowing between the solidified part and the oil interface, for each specific polymerization liquid and to optimize vertical print rates.

The depth of the cure-zone can be estimated as described herein. For example, the hard urethane acrylate resin described in the Examples typically has $E_c$ and $D_p$ values of 13 mJ/cm² and 800 μm once formulated. At a print rate of 120 μm/sec, the resultant cure-zone is 200 μm thick and $E_{total}$ is 58 mJ/cm². The ABS-like urethane acrylate resin was formulated to $E_c$ and $D_p$ values of approximately 15 mJ/cm² and 600 μm; at a print rate of 120 μm/sec the resultant cure-zone is 250 μm (slightly larger allowing for better resin flow) but the $E_{total}$ drops to 44 mJ/cm² resulting in a weaker green-part strength. While this formulation remained in a printable domain, the drop in green strength of the emerging part was noticeable—it is likely that for this resin dropping the $E_{total}$ below 35 mJ/cm² would result in a part not strong enough to sustain its own weight. Alternatively, these $E_c$ and $D_p$ values could also be printed at 100 μm/sec to give a cure-zone of 200 μm with a higher $E_{total}$ increasing to 58 mJ/cm² to make the cure response more similar to the hard urethane acrylate material. Yet this enhanced cure-behavior and green strength would come at the compromise of a slower print speed. Likewise, as one explores polymerization liquids of higher viscosities or larger cross-sectional areas, a thicker cure-zone will need to be maintained.

In embodiments, the apparatus can be provided as a closed system, such that the three-dimensional object being printed, the dewetting material, and the polymerization liquid are not exposed to the environment. In embodiments, the apparatus can be provided as a closed system that is free or substantially free of oxygen. For example, the atmosphere of the closed apparatus can include a gas such as nitrogen or argon.

Fabrication Products

Three-dimensional products produced by the methods and apparatus of the present disclosure may be final, finished or substantially finished products, or may be intermediate products subject to further manufacturing steps such as surface treatment, laser cutting, electric discharge machining, etc., is intended.

Numerous different products can be made by the methods and apparatus of the present disclosure, including both large-scale models or prototypes, small custom products, miniature or microminiature products or devices, etc. Examples include, but are not limited to, medical devices and implantable medical devices such as stents, drug delivery depots, functional structures, microneedle arrays, fibers and rods such as waveguides, micromechanical devices, microfluidic devices, etc.

The processes described herein can produce products with a variety of different properties. Hence in some embodiments the products are rigid; in other embodiments the products are flexible or resilient. In some embodiments, the products are a solid; in other embodiments, the products are a gel such as a hydrogel. In some embodiments, the products have a shape memory (that is, return substantially to a previous shape after being deformed, so long as they are not deformed to the point of structural failure). In some embodiments, the products are unitary (that is, formed of a single polymerization liquid); in some embodiments, the products are composites (that is, formed of two or more different polymerization liquids). Particular properties will be determined by factors such as the choice of polymerization liquid(s) employed.

The methods and apparatus in accordance with the disclosure can be better understood in light of the following examples, which are merely intended to illustrate the constructs and are not meant to limit the scope thereof in any way.

EXAMPLES

Polymerization liquids used in the following examples are described in the table below:

| | |
|---|---|
| Hard Urethane Acrylate | 20 g Phenylbis(2,4,6-trimethylbenzyl)phosphine oxide Or 4 g Diphenyl(2,4,6-trimethylbenzoyl)phosphine oxide; And 500 g 1,6-Hexanediol diacrylate (HDDA) monomer diluent and 500 g Dymax BT-970 (a proprietary polyurethane difunctional acrylate from Dymax Corporation) |
| Elastomeric Urethane Acrylate | 20 g Phenylbis(2,4,6-trimethylbenzyl)phosphine oxide Or 4 g Diphenyl(2,4,6-trimethylbenzoyl)phosphine oxide; And 500 g Isobornyl Acrylate (IBOA) monomer diluent and 500 g Dymax BT-970 (a proprietary polyurethane difunctional acrylate from Dymax Corporation) |

-continued

| | |
|---|---|
| Ceramic | 20 g Phenylbis(2,4,6-trimethylbenzyl)phosphine oxide Or 0.4 wt. % Diphenyl(2,4,6-trimethylbenzoyl)phosphine oxide; And Vinylmethoxysiloxane homopolymer and (mercaptopropyl)methylsiloxane homopolymer in a vinyl:mercapto molar ratio of 1.2. |

3D Object Design, Slicing, Video Preparation, and UV Projection

3D STL objects were designed in Blender (version 2.72), an open source CAD rendering software geared towards graphic arts and video processing. These objects were then transferred into Autodesk Netfabb, in which support structures (as needed) could be applied. Netfabb was used to slice the STL objects and accompanying supports into 10 µm layer JPEG images with lateral resolutions corresponding to the UV projection source. 10 µm layer slices were selected to balance computational data-processing constraints and resultant part z-resolution. Previous studies with CLIP have demonstrated that as slice-thickness drops from 25 µm to 1 µm, the changes in z-resolution are minimal. Ultimately, the slice-thickness is limited by the refresh rate of the computer system, the light engine, and how the data is compressed/transmitted (e.g., an HDMI connection operating at a 60 FPS for a 120 µm/sec vertical print speed results in a theoretical minimal thickness of 2 µm per frame). Given the large number of pixels needed to cover the large-area print bed, data throughput and the ability to render image stacks without dropping frames becomes a concern. Ultimately, it was discovered that most media players would drop below 60 FPS sporadically when displaying a video data-set (i.e., the player reduces the frame rate to 30 or 15 FPS when codec decompression algorithms become computationally burdensome so as to keep in time-synch with the retracting z-arm). We found that operating at a frame-rate of 12 FPS (10 µm slices at 120 µm/sec) to be sufficiently low to ensure a continuous frame rate and to ensure z-slices are not unintentionally dropped.

Once an image stack was generated, the images were loaded back into Blender and compiled into AVI video files playing at 12 frames per second (12 FPS×10 µm/frame=120 µm/sec video). The videos were projected through a series of DLP (Digital Light Processing) projectors modified to project UV light. Lamp sources varied between different printers; some projection systems utilized medium pressure Hg lamps while others used monochromatic UV LEDs. For broad-band UV lamp sources, phenylbis(2,4,6-trimethylbenzyl)phosphine oxide was used as the photo-initiator system. For mono-chromatic UV sources diphenyl(2,4,6-trimethylbenzoyl)phosphine oxide was used as the photo-initiator. The projectors were stitched together to create a continuous large projection field of view (maximum projection field of view was 38 cm×61 cm at 240 µm pixel resolution).

Fluid Flow System

The dewetting material fluid flow system consists of a low-iron glass aquarium (referred to herein as a "member" or "vat"), an outlet manifold, a four lobe diaphragm pump, a series of microparticulate filters, a thin-wall plate heat exchanger, and a return inlet manifold. The inlet and outlet manifolds, responsible for removing the dewetting material and returning the dewetting material to the glass aquarium, were designed to generate a uniform velocity profile across the build region (see FIG. 5A). A recirculating chiller was plumbed through the heat exchanger to cool the dewetting material; the chiller unit was sized to correspond to the printer's build region (i.e. smaller printers only require a bench-top recirculating chiller, whereas the larger 38 cm×61 cm build region mentioned above required a larger Thermo Scientific Merlin-M150 industrial chiller to sufficiently remove heat from the system).

Printing Procedure

Prior to printing, the dewetting material fluid flow system was turned on to allow for the dewetting material temperature to equilibrate to a temperature between 10° C. and 15° C. At this point the flow was temporarily stopped to pour the polymerization liquid (resin) into the system, so as to avoid resin entering the outlet manifold, and the flow restarted. The print stage, held by a ball-screw actuator arm, was then brought into contact with the dewetting material-polymerization liquid interface. A 30 second UV exposure time was used to generate the initial adhesive layer of polymerization liquid onto the steel build platform, and then the video was started in conjunction with the retraction of the build platform at 120 µm/s. While print speeds of 240 µm/s were achieved, the quality of such prints and the reliability of the print process dropped substantially relative to print speeds of 120 µm/s.

Post Processing

After the print was finished, the part was removed from the stage and washed in methanol to remove any unsolidified polymerization liquid. Support structures were then removed from the part manually with wire cutters. Finally, the green parts were placed overnight in a light oven to give the three-dimensional objects the final material properties. For polymerization liquids with phenylbis(2,4,6-trimethylbenzyl)phosphine oxide as the photoinitiator, a high intensity Hg arc UV lamp was used to complete the curing process. For polymerization liquids with diphenyl(2,4,6-trimethylbenzoyl)phosphine oxide as the photoinitiator, 385 nm LEDs were used to complete the curing process. Diffusive, reflective aluminum sheeting (Anoment, Inc.) was used to spread the light intensity evenly across the part, and to better achieve an even UV exposure across large specimens and multiple reflections which enabled penetration deeper into the lattices. Following UV post-curing, the butadiene rubber green parts were place in the oven at 120° C. for 1 hour to initiate secondary reactive elements. Following UV post-curing, the ceramic print was heated in a furnace to 1000° C. following the thermal ramp protocol outlined in X. Kuang et al. *Macromot Rapid Commun.* 39, e1700809 (2018).

Photomicrography

All optical images and videos of objects were taken with a Canon 70D camera, or equivalent. Particle image velocimetry videos were collected with an Edmunds Optics EO-1312M camera, or equivalent. Thermal imaging was performed using FLIR SC7650 IR camera calibrated for a sensor range of 20° C. to 150° C., or equivalent.

CT Tomographic Reconstruction

CT tomographic reconstruction was done using a Mediso nanoScan PET/CT instrument, or equivalent. The reconstruction of the slices and comparative analysis was done using the Amira software package, version 6.7. The analysis compared the STL object used to produce the image stack with the scanned volume of the part.

Profilometry Measurements

Height profile and arithmetic surface roughness data was collected using a Veeco Dektak 150 High Resolution Stylus Surface Profilometer equipped with a 5.0 µm tip radius stylus, or equivalent. Line scans were collected over several millimeters along the z-axis of the object (in-line with the print direction) and were line-corrected to account for macroscopic drift in the height profile. Arithmatic roughness and line scans were collected for a range of parts with varying thicknesses (1 to 3 mm) and widths (1 to 6 mm) as presented in FIG. 21E.

Example 1: Thermal Control and Imaging

To quantify the ability of the disclosed methods to dissipate heat, thermal imaging of a small test print (5 cm×5 cm cross-sectional dimensions) in a specially designed miniature print vat (i.e., low-profile walls to enable imaging across the build region). Three different flow scenarios were conducted: (i) printing without a mobile dewetting material interface or active cooling (FIG. 20A); (ii) printing with a mobile dewetting liquid interface to actively dissipate heat, but with no cooling of the oil (FIG. 20B); and (iii) printing with a mobile dewetting material interface and active cooling of the oil (FIG. 20C). Without flow to actively dissipate heat, the printed part quickly exceeded the sensor range of the infrared (IR) camera at 150° C. and exceed the flashpoint of the polymerization liquid's primary monomer diluent (1,6-hexanediol diacrylate, 113° C.). Similar trials involving the generation of parts having larger cross sectional areas (e.g., 20 cm×20 cm) exceed 180° C. (as evidenced by an IR noncontact thermometer gun measurement) in the absence of an active flow to dissipate the accumulating heat. In the case presented here, the accumulation of heat (FIG. 20A) led to surface temperatures in excess of 150° C. and the part cracked during the printing process, causing a physical displacement from the stage (observable in the final frame of FIG. 20A indicated by white lines overlaid on the part; see also FIG. 16). The flow of dewetting material in FIG. 20B acted to dissipate this heat into an dewetting material reservoir, but over time, the reservoir increased in temperature and lost the ability to effectively dissipate the heat of the reaction. Finally, in FIG. 20C, the dewetting material was actively cooled while flowing to help stabilize the reservoir temperature, as well as the surface temperature of the emerging part, at 100° C. to 120° C.

The impact of thermal control on part resolution and clouding was evident. As shown in FIG. 16, the part on the left is an optical image of the part printed in FIG. 20A (wherein the dewetting material is not flowing and there is no cooling). On the right is the part printed with flow of the dewetting material and cooling (corresponding to FIG. 20C). At the base of the part (FIG. 16, left) a loss of optical resolution clearly coincides with a loss of thermal control, as evidenced by how the crisp edges of the part beginning to fade as the print progressed. Additionally, the cracking and displacement can be more clearly seen. For the part on the right, thermal control allows for the part edges to remain crisp throughout the entire print process.

Thus, Example 1 shows that in the absence of heat removal rapid vertical print speeds of even modestly sized parts quickly exceed the smoke point of the polymerization liquid and/or clouding occurs and gives rise to a lack of vertical resolution. Example 1 further demonstrates printing of three-dimensional objects at rapid rates having maintained lateral resolution according to methods of the disclosure on an apparatus of the disclosure.

Example 2: Modeling of Slip Boundary

To confirm the presence of a slip boundary, particle imaging velocimetry was used to analyze the cross-sectional fluid flow profile as the dewetting material passed beneath a printed part. Slip boundary conditions are difficult to observe because of the randomized optical reflections that occur at the interfaces under study, resulting in noisy data. To rectify this problem, an analytical model was fit, allowing for the possibility of either a slip or non-slip boundary conditions, to the center of the flow profile (i.e., where high-quality data can be collected). The model allowed for a classical Navier slip boundary to arise when the interfacial shear stress exceeded a given critical shear stress. From this analysis the slip boundary model captured the dynamics of the experimental data.

Figure 7A:
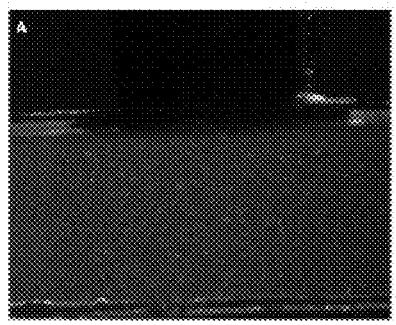
FIG. 7A is an optical image of a PIV experiment in process. The bottom layer consists of oil with light scattering micro-particles (white dots).
Figure 7B:
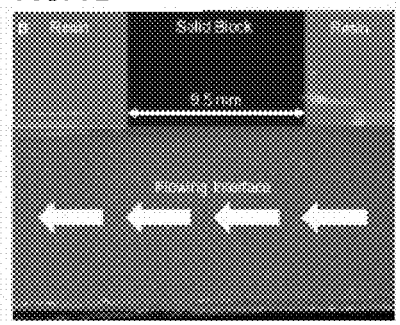
FIG. 7B is a labeled overlay of FIG. 7A.
Figure 7C:
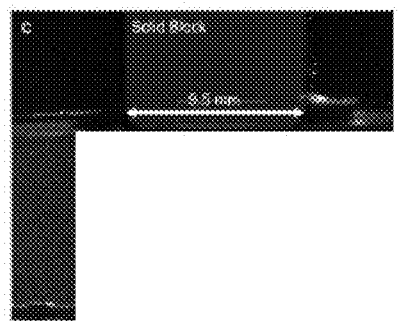
FIG. 7C is a representative flow profile of the dewetting material interface calculated from particle-tracking analysis; the white box represents the region of interest and the vertical line represents the poly-line from which $v_x(y)$ is exported, and the small arrows represent the flow velocity vector field at each point in the x-y plane.

Particle image velocimetry (PIV) was used to observe the dewetting material oil flow behavior as a function of the volumetric pump flow rate (50% to 100% power of the positive displacement pump utilized), using a four lobe diaphragm pump, or equivalent. The print vat was filled with a fluorinated oil as the dewetting material and the hard polyurethane acrylate polymerization liquid (without photoinitiator), and the dewetting material recirculated using a pair of flow manifolds. A block was then placed in the vat at the resin-oil interface to represent a cured part, while particulate matter was mixed with the oil and flown across the field of view (FIG. 7A-7C). A line laser was projected from the bottom of the bat to illuminate the particulate matter in the oil phase to enable tracking of the oil flow profile via right-angle scattering into an Edmunds Optics EO-1312M camera (FIG. 7A), or equivalent. Video was collected of right-angle scattering, and then processed in PIVlab, an application designed for MATLAB to analyze the flow profile (FIG. 7C). Within PIVlab, the following settings were used to generate a velocity map profile.

(a) a region of interest was defined under the printed part (corresponding roughly to the area indicated in FIG. 7C)
(b) the image stack was pre-processed with the CLAHE filter (10 px), high pass filter (50 px), denoise filter (5 px), and auto contrasting
(c) the PIV analysis was performed with the default settings of a FFT PIV algorithm, a Pass 1 integration area of 64 px and step of 32 px, a Pass 2 integration area of 32 px and step of 16 px, a linear deformation interpolator, and a Gauss 2×3 sub-pixel estimator
(d) post-processing vector validation was performed with a $v_x$ limit of 20 px/frame and removal of vectors outside of 2× the standard deviation of the vector set; this removes outlier reflections at the interfaces or in regions where there are solid objects
(e) a vertical poly-line was drawn through the region of interest (starting in the glass aquarium bottom, up through the oil, and into the solid 'printed' object); the lateral velocity ($v_x$) along this y axis was exported for analysis
(f) each volumetric flux condition (50%, 60%, 70%, 80%, 90%, and 100% pump intensity) was off-set corrected based upon where the poly-line from step (e) began and ended (e.g. Δy offset correction between data series)
(g) vectors overlapping with solid objects or influenced by the 'moving-average' integration area (based upon the pass integration areas used in step (c)) near the edges of the solid object were discarded; this was easily detected by looking for the inflection point in the $2^{nd}$ differential for the experimental data ($d^2(v_x)/dy^2$).

Figure 6A:
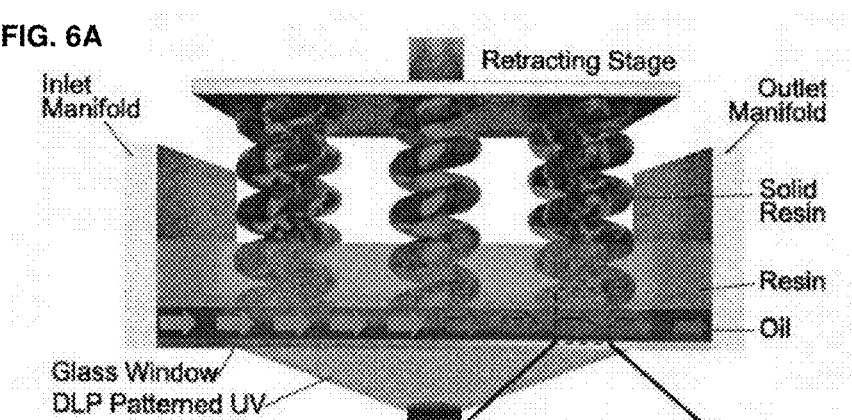
FIG. 6A is a side schematic view of one embodiment of an apparatus carrying out a method as disclosed herein, in particular an apparatus having a transparent wind (glass window), an adhesion stage (retracting stage), a polymerization liquid (resin), a flowing dewetting material (oil), and a green polymer (solid resin).
Figure 6B:
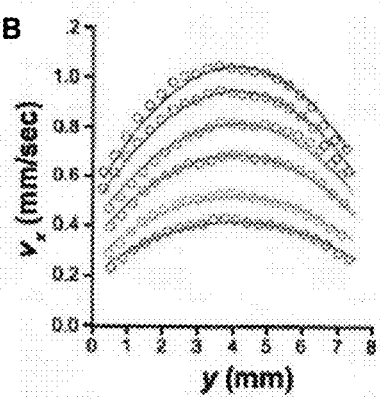
FIG. 6B is a chart of the dewetting material velocity profile under the green polymer of the apparatus of FIG. 6A at different flow speeds, demonstrating the presence of a slip boundary. Each parabola represents an increasing volumetric flux, q (from bottom to top: q=0.21 mm/s; q=0.30 mm/s; q=0.44 mm/s; q=0.56 mm/s; q=0.66 mm/s; q=0.75 mm/s). Open circles are experimental data points from particle-imaging velocimetry; continuous lines are fits from an analytical model.
Figure 6C:
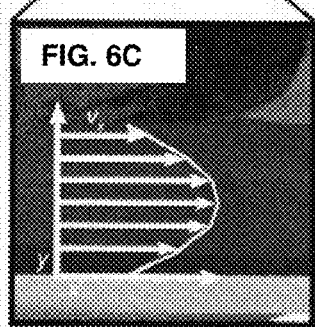
FIG. 6C is an inset of the slip boundary flow profile under the green part of FIG. 6A, with a representative experimentally observed flow profile.
Figure 6D:
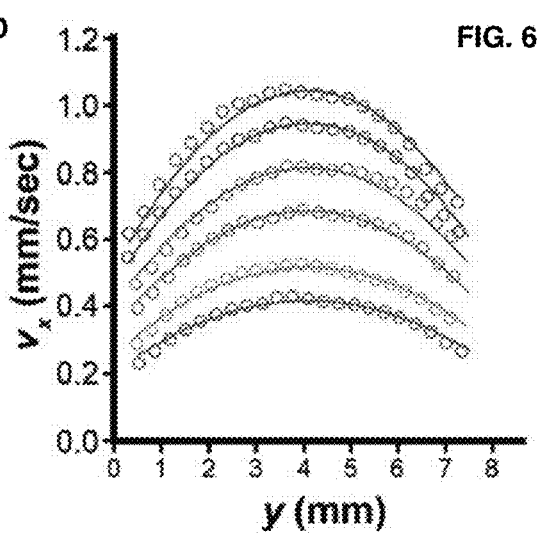
FIG. 6D is an enlarged view of FIG. 6B.

The resulting experimental data of this PIV analysis is plotted in FIG. 6B, 6D, $v_x(y)$, as open data points for a range of pump speeds. The velocity data can be integrated across the y-axis to give rise to the volumetric fluxes, q, for each pump speed (FIG. 6D, from bottom to top: bottom corresponds to 50% pump speed or q=0.21 mm/sec, 60% pump speed or q=0.30 mm/sec, 70% pump speed or q=0.44 mm/sec, 80% pump speed or q=0.56 mm/sec, 90% pump speed or q=0.66 mm/sec, and 100% pump speed or q=0.75 mm/sec). There is a direct linear relation between the pump seed and volumetric flux with $R^2$=0.995.

The velocity profiles suggests that there is a slip boundary at the glass/dewetting material interface as well as the dewetting material/part interface; based on the fact that simple extrapolation of the data near the walls would not result in $v_x(y=0 \text{ mm})\approx 0$ mm/sec or $v_x(y=8.19 \text{ mm})\approx 0$ mm/sec. Based upon this observation, an analytical model was applied assuming that the boundary conditions would abide by the Navier slip above a critical slip yield stress and would be symmetric. The Navier critical-stress slip boundary condition was applied to the planar Poiseuille flow simplification of the Navier-Stokes equation.

The full Navier-Stokes equation for pressure-driven flow between two infinite plates (i.e., Poiseuille flow) spaced 2 h apart can be simplified to:

$$\frac{d^2 v_x}{dy^2} = \frac{-G}{\mu} \text{ wherein } G \equiv \frac{-dP}{dx} \text{ is an unknown constant} \quad \text{equation (i)}$$

The Navier critical-stress slip boundary condition can be described as:

$$v_x|_{y=\pm h} = \begin{cases} 0 & ; \; \tau|_{y=\pm h} \leq \tau_c \\ \frac{1}{\beta}((\tau|_{y=\pm h}) - \tau_c) & ; \; \tau|_{y=\pm h} > \tau_c \end{cases} \quad \text{equation (ii)}$$

where the velocity at the walls (i.e., $v|_{y=\pm h}$) is zero and abides the non-slip boundary condition when the wall shear $\tau|_{y=\pm h}$ is below a certain critical wall shear stress, $\tau_c$. When above that critical shear stress, the velocity at the walls takes on a traditional Navier slip boundary conditions where β is the slip coefficient (here, we assume $\beta_{glass/oil} \approx \beta_{part/oil} \approx \beta$).

These equations can be made dimensionless by defining the following dimensionless variable groupings. Here, h is the distance from the center of the channel to the wall (i.e., the gap height is 2 h), and μ is the viscosity of the oil.

$$U(\hat{y}) = \frac{v_x \mu}{\tau_c h} \quad \hat{G} = \frac{Gh}{\tau_c}$$

$$\hat{\tau} = \frac{\tau}{\tau_c} \quad \hat{y} = \frac{y}{h} \quad B = \frac{\mu}{\beta h}.$$

The nondimensional versions of equation (i) and (ii) are, respectively:

$$\frac{d^2(U(\acute{y}))}{d\acute{y}^2} = -\acute{G} \quad \text{equation (iii)}$$

$$U|_{\acute{y}=\pm 1} \begin{cases} 0; \acute{G} \leq 1 \\ B(\acute{G}-1); \acute{G} > 1 \end{cases} \quad \text{equation (iv)}$$

Equation (iii) can be integrated twice to yield:

$$U(\acute{y}) = \frac{-\acute{G}\acute{y}^2}{2} + C_1 \acute{y} + C_2. \quad \text{equation (v)}$$

Equation (iv) can be used in conjunction with equation (v) to solve for $C_1$ and $C_2$ under the conditions where $\acute{G} \leq 1$ and $\acute{G} > 1$ to yield:

$$U_{(\acute{y})} \begin{cases} \frac{\acute{G}}{2}(1 - \acute{y}^2); \acute{G} \leq 1 \\ \frac{\acute{G}}{2}(1 + 2B - \acute{y}) - B; \acute{G} > 1 \end{cases} \quad \text{equation (vi)}$$

Equation (vi) can be brought back into dimensional space to yield:

$$v_x(y) \begin{cases} \frac{\acute{G}}{2\mu}(h^2 - y^2); Gh \leq 1 \\ \frac{\acute{G}}{2\mu}(h^2 - y^2) + \left(\frac{Gh}{\beta} - \tau_c h\right); Gh > 1 \end{cases} \quad \text{equation (vii)}$$

In equation (vii), there are two fitting constants in the conditional statement, G and $\tau_c$. For ease of fitting this discontinuous equation to the experimental dataset it is convenient to define a new grouping, $$\alpha = \frac{\tau_c}{G},$$

and to eliminate the unknown variable G so that this ratio can be the new fitting constant and used to decide the conditional statement alone (thus allowing for a potential solution to converge quicker during error minimization. This substitution yields:

$$v_x^{fit}(y) \begin{cases} \frac{\tau_c}{2\mu\alpha}(h^2 - y^2); h \leq \alpha \\ \frac{\tau_c}{2\mu\alpha}(h^2 - y^2) + \left(\frac{\tau_c h}{\alpha\beta} - \tau_c h\right); h > \alpha \end{cases} \quad \text{equation (viii)}$$

Now we have an equation describing the lateral velocity as a function the y-axis position, $v_x(y)$, with a series of known constants, and unknown fitting constants. The known constants include the viscosity of the dewetting material oil, $\mu$=0.0722 g/(mm sec), and the height of the gap, 2 h=8.19 mm. The unknown constants include the critical wall shear-stress at which slip begins to occur, $\tau_c$, with units g/mm·sec$^2$, the slip coefficient $\beta$ with units mm$^2$ sec/g, and the ratio $\alpha$ with units of mm.

For our dataset, a series of $v_x(y)$ for varying pump speeds, both $\tau_c$ and $\beta$ are global material constants while $\alpha$ is dependent upon G=-dP/dx and thus the pump speed. In other words, $\tau_c$ and $\beta$ are constant for all data series within the set, but a will change depending upon which data series we are fitting. For this reason, it's useful to redefine the dataset as $v_x(y,i)$ with fitting constants $\tau_c$, $\beta$, and $\alpha_i$ where i represents the index of a specific data series (i.e., pump speed is 50%, 60%, etc.) for a total of 8 fitting constants. For the five a fitting constants, there is the additional constraint that they must maintain a linear relationship with their corresponding pump speeds.

Figure 6E:
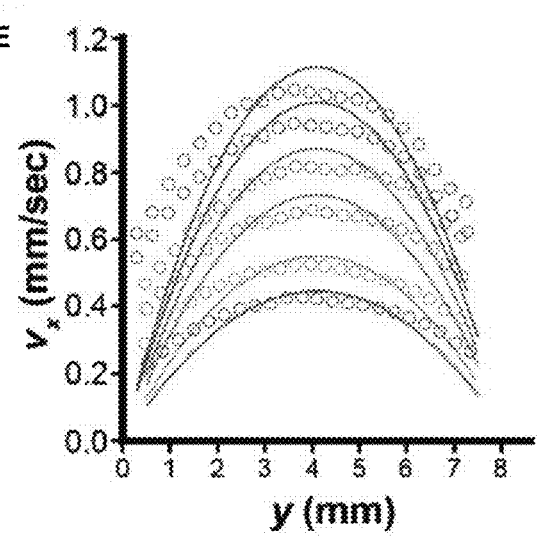
FIG. 6E is the same chart of dewetting material velocity profile of FIG. 6D, but overlaid with model fits when the model is constrained to non-slip boundary conditions.

The total error between the model and dataset can be calculated as e=$\Sigma_i\Sigma_y[|v_x(y)-v_x^{fit}(y)|]$, wherein i is the index for each data series within the data set, and minimized as a function of the fitting constants, $\tau_c$, $\beta$, and $\alpha_i$. This results in the fitting values converging to $\tau_c$=11×10$^{-6}$ g/(mm·sec$^2$), ($\beta$=7.37×10$^{-2}$ mm$^2$ sec/g, and a ranging from 6 μm to 2 μm for the range of pump speeds (50% to 100%). As expected, the linear relation between a and pump speed is maintained with R$^2$=0.995. The resultant model fit is represented by the solid lines within FIG. 6B. Lastly, as was qualitatively observed earlier, all experimental conditions have slip-boundaries. This is confirmed given that all values of a are less than h=4.1 mm. This can be further confirmed by forcing the model to accept the non-slip condition (i.e., remove the conditional option during the fit analysis) and then, examining the goodness of fit. From the plots in FIG. 6E the non-slip condition is a substantially inferior model for understanding the dataset.

Thus Example 2 demonstrates the presence of a slip boundary in the method and apparatus of the disclosure.

Example 3: Printing in an Oxygen-Free Atmosphere

All polymerization liquid in the system was solidified and removed. An argon tank was connected to the inlet purge valve and the chamber was sealed. With the pump off, the argon flow was turned on to purge the fluorinate oil (dewetting material) in the vat and fill the chamber for 30 mins. The pump was turned on and the argon flow turned down to the highest rate at which both oil and argon gas bubbles could be seen being taken through the pump and coming out of the vat at the outlet manifold. This was kept at steady state for 25 hours. Due to the high buildup of argon in the tube of the system, the argon tube was disconnected from the purge valve and placed over the vat. The flow rate was also increased to ensure the vat stayed blanketed by argon. Argon gas pockets were worked out of the system as best a possible by bending the sealed flexible tubing. Note: some argon gas bubbles continued to come out of the system over the following hours due to the large amount in the system. Fresh hard polyurethane acrylate polymerization liquid was poured into the system and the cooling unit was turned on.

Multiple print runs were made with 100% success rate with features ranging from 1 mm to 0.5 m in size. The print rate was a continuous pull at 120 microns per second. Argon was still pumping in the chamber during prints.

Thus, Example 3 shows successful printing in an oxygen-free, dead zone free, apparatus according to the disclosure using a method according to the disclosure.

Example 4: Scalability of Method

Figure 13:
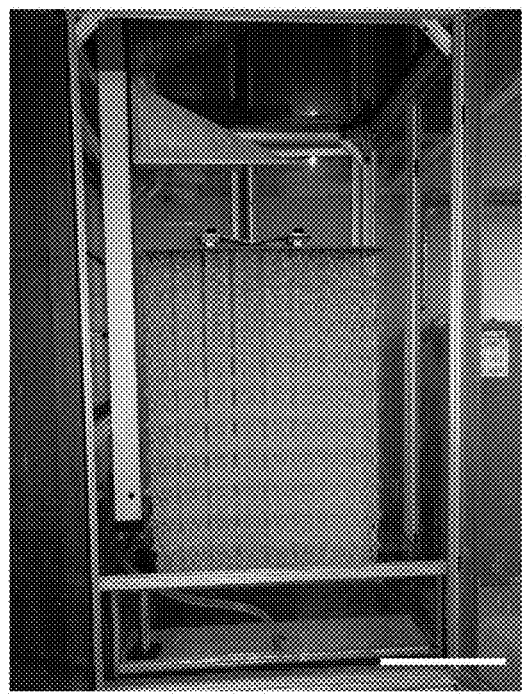
FIG. 13 is a 3D printed part out of hard urethane acrylate resin using methods and apparatus of the disclosure having dimensions of 61 cm×38 cm×76 cm and a print time of 1 hour and 45 minutes. The design is an extended version of the lattice structure presented in FIG. 22F. Scale bar is 30 cm, print speed is 120 micron/sec, optical print resolution is 250 micron, UV source was a broad-band mercury lamp, photo-initiator used was Omnirad 819.
Figure 21B:
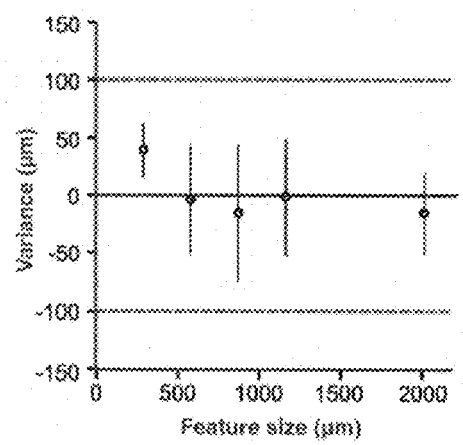
FIG. 21B is a plot of the variation between the designed and printed features as a function of feature size down to 300 micron (below this, the ability to resolve parts becomes inconsistent) using a light patterning engine with an optical resolution of 100 micron, demonstrating high spatial resolution and print fidelity. Data points are mean values, error bars represent the standard deviation across 10 5-mm posts printed in differing regions of the print bed. Dashed lines represent the bounding constraints of ±1 pixel for the light-patterning engine. The hard polyurethane acrylate resin was used.
Figure 21C:
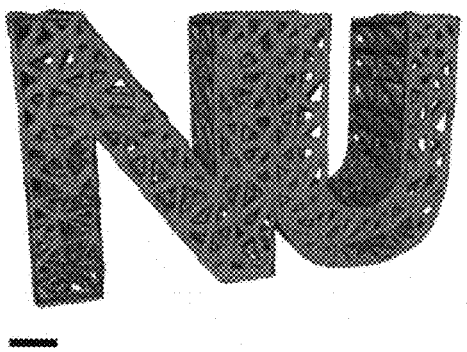
FIG. 21C shows a computed tomography (CT) scan between a printed part (print rate 120 micron/s, optical resolution 100 micron) and its CAD design file, revealing a volumetric correlation of 93%. Scale bar is 1 cm. The hard polyurethane acrylate resin was used.
Figure 21D:
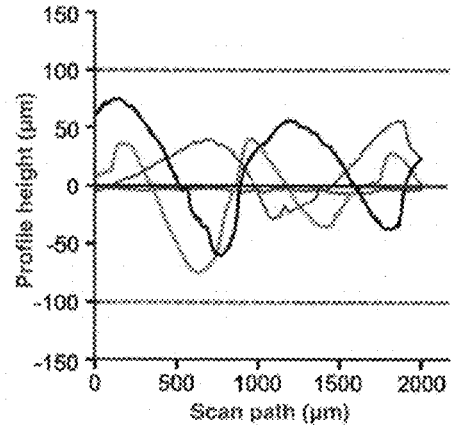
FIG. 21D shows representative height profile scans along the print direction for a series of 3 mm thick dog bones, for varying widths. Dashed lines represent the bounding constraints of ±1 pixel for the light-patterning engine. The hard polyurethane acrylate resin was used.

To demonstrate the scalability of the methods of the disclosure on an apparatus of the disclosure a 38 cm×61 cm×76 cm part was printed in 1 hour and 45 minutes with a volumetric throughput of 100 liters/hour. The print was prepared out of the hard urethane acrylate polymerization liquid with dimensions of 61 cm×38 cm×76 cm and a print time of 1 hr and 45 min. (FIG. 13), without loss of lateral resolution. A fluorinated oil was used as the dewetting material and the dewetting material was flowed across the member and recirculated. At this scale, the fidelity of the print was affected by the polymerization liquid's contractility (i.e., the volumetric reduction undergone during the solidification process, common to all SLA resins and unique to each resin formulation) because even modest contractions of a few percent were amplified into observable bowing. In contrast, when smaller single parts were produced, this contractility became less evident and print fidelity increased (FIG. 21C). It is expected that polymerization liquids with lower contractility can allow full use of the large-scale capabilities of the methods of the disclosure.

Figure 9:
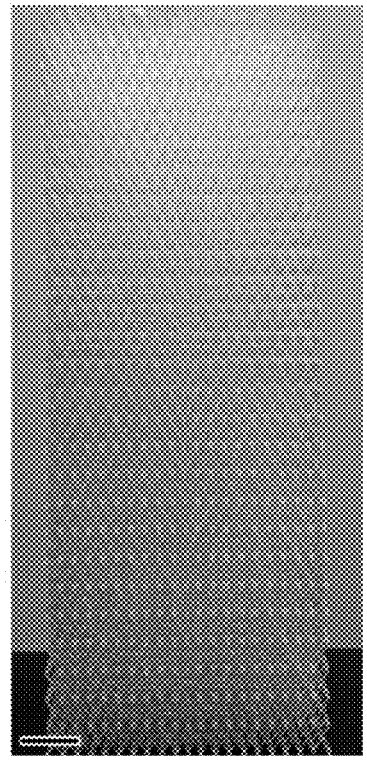
FIG. 9 is a part printed using the methods and apparatus of the disclosure having a size of 25 cm×15 cm×70 cm made out of hard urethane acrylate resin with a print time of 1 hr and 40 min. The part design is a high density argyle lattice (optics resolution of 100 micron, monochromatic UV source, photoinitiator used is TPO). Scale bar is 5 cm.

Additionally a high area rapid printing 3D part was printed according to the methods of the disclosure on the apparatus of the disclosure. The polymerization liquid was the hard urethane acrylate resin and the 25 cm×15 cm×70 cm part was printed in 1 hr and 40 min. The part design is a high density argyle lattice (optical resolution of 100 µm, UV source, TPO photoinitiator), and shown in FIG. 9.

Thus, Example 4 demonstrates successful large-scale prints using the methods and apparatus of the disclosure.

Example 5: Polymerization Liquids

By not relying on oxygen quenching, the methods of the disclosure are capable of printing both oxygen sensitive and oxygen-insensitive polymerization liquid chemistries. To demonstrate this ability, three different polymerization liquids were printed on an apparatus of the disclosure to generate three different classes of materials with varied properties: the hard polyurethane acrylate, an elastomeric butadiene rubber, and the silicon carbide ceramic. The resins that make up the polymerization liquids are available commercially. The polymerization liquids were optimized in terms of initiators and blockers to perform in conjunction with the light engine and desired vertical print rate, as is necessary for polymerization liquids used with all SLA systems. The polymerization liquids were optimized by altering the photo-initiators used and turning their concentrations to achieve a desired energy cure and penetration depth response for each resin. The hard polyurethane acrylate polymerization liquid printed optimally under a vertical print speed of 120 µm/s (FIGS. 22A and 22F). The ceramic polymerization liquid used thiolene-click chemistry, a chemistry known to be relatively oxygen-insensitive, to cross-link the polymeric resin and produce the green part. The polymeric silicone was post-treated in a furnace at 1000° C. to undergo pyrolysis to eliminate the organic components and produce a silicon carbide structure (FIG. 22B). Finally, the butadiene rubber resin required a slower print speed (30 micron/s) owing to its lower reactivity and higher viscosity (FIGS. 22C, 22D, and 22E). Although the post processing and print conditions differed for each resin (FIG. 22), all the resins were compatible with the methods and apparatus of the disclosure.

Thus, Example 5 shows that the methods and apparatus of the disclosure are generally useful with stereolithographic resins currently available and are not limited to only resins that are oxygen-sensitive.

Example 6: Mechanical Properties of Continuously Printed Objects

An array of dog bone like structures (80 dog bones per array) in different regions of the print bed were prepared using methods and apparatus of the disclosure from an acrylonitrile butadiene styrene (ABS)-like urethane acrylate resin in multiple orientations according to the protocols of ASTM standard D638 for type I dog bones. The first array had parts spanning a wide range of rectangular thicknesses and widths within the neck of the dog bone. This array was used to analyze what geometric variables might be correlated with the surface roughness—minimum feature thickness, maximum feature thickness, or across-sectional area. The second array consisted of dog bone structures which maintained the profile of an ASTM D638 Type IV dog bone, but consisted of thicknesses ranging from 1 mm to 3 mm. This array was used to examine if they varying thicknesses (and consequently variations in surface roughness) had a correlation with the ultimate bulk material properties (in this case, maximum tensile strength).

Profilometry was used to analyze the first array of varying geometries. Line scans were conducted along the print-direction of the object, and data was collected for the roughest surface on the part. The profiles of these dog bone structures are shown in FIG. 19A-19D. As can be seen, for every geometry with a dimension below 1.5 mm the profile variation from valley to peak remained within ±10 µm. At 2.0 mm, this changed to profile variations within ±100 µm. It should be noted that these experiments were performed with an optical engine with a resolution of 100 µm—as such, this data indicates that with the observed surface profiles that the parts produced fall within ±1 optical pixel (FIG. 21D and FIG. 19A-19D). The sharpness and repeatability of this transition are surprising and might represent a transition in flow-dynamics based upon the added polymerization liquid replenishment challenges for the larger cross-sections. The arithmetic surface roughness for each of the dog bones was plotted as a function of (i) the part's minimum dimension, (ii) the part's maximum dimension, and (iii) the part's cross-sectional area. Pearson correlation coefficients were used to quantify the correlation of the data set, where critical values could be used to accept or reject the hypothesis of a linear correlation with a 95% confidence interval.

Figure 21E:
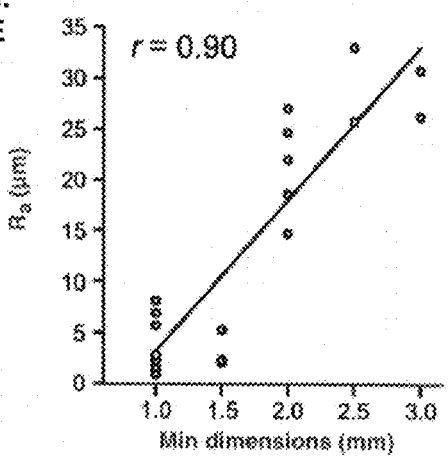
FIG. 21E shows the arithmetic surface roughness, $R_a$, of the printed parts as a function of minimum feature dimension, revealing a strong linear correlation with a Pearson correlation of r=0.90 for 95% CI. The hard polyurethane acrylate resin was used.

As shown in FIG. 21E, there is a strong correlation between the minimum part dimension and the arithmetic surface roughness, with a Pearson correlation coefficient of r=0.900 (n=20, $r_{crit}$=0.423 for 95% CI), demonstrating that the distance the polymerization liquid must flow through the cure-zone to reach the center of the part is an important variable. The maximum part dimension and cross-sectional area showed substantially weaker correlations (maximum part dimension r=0.445, n=20, $r_{crit}$=0.423 for 95% CI; cross-sectional area r=0.772, n=20, $r_{crit}$=0.423 for 95% CI). The maximum part dimension correlation is weak and barely passes a 95% confidence interval test (it does fail a 99% CI test where $r_{crit}$=0.537); the cross-sectional area correlation is moderate, likely due to it being a combination of the two other variables.

Figure 21F:
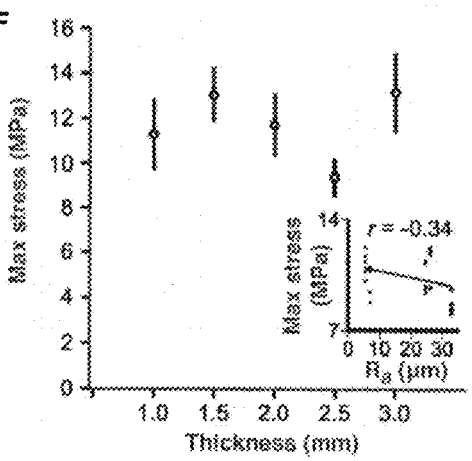
FIG. 21F is a plot of the maximum tensile stress as a function of feature size, demonstrating maximum tensile stress remains invariant of feature size (data points are mean values, error bars represent standard deviation across five type IV dog bones). The insert shows a scatterplot for each done bone, revealing a Pearson correlation coefficient between surface roughness and maximum tensile stress of r=−0.34 for 95% CI. The hard polyurethane acrylate resin was used.

Mechanical tensile testing was used to analyze the second array of dog bones (the pseudo Type IV dog bones) to determine if there was a correlation between arithmetic surface roughness and the ultimate tensile stress. It was expected that the onset of necking during tensile testing would be different for each geometry examined and, as a result, there would be a variance in maximum stresses between the different geometries. Because the relationship between geometry and surface roughness could not be decoupled, this variation was assumed to be nominal. As shown in FIG. 21F, the tensile stress was invariant with the part thickness and within the error of the measurements taken. When these stresses are then plotted in a scatter plot with the accompanying arithmetic roughness (FIG. 21F, insert), no correlation was observed between the bulk material properties and the surface roughness.

The mechanical properties of the array of type I dog-bone structures were tested and it was found that the prints maintain isotropic mechanical properties comparable to a molded part (FIG. 18A, 21A) and that these properties are independent of print orientation, unlike other modes of noncontinuous printing (FIG. 18B). In addition, the prints prepared according to methods of the disclosure were prepared with high print fidelity (FIGS. 21B and 21C), resolving features as small as 300 μm (the theoretical optical resolution is 100 μm and is a function of the light-patterning engine), and achieving a volumetric correlation of 93% on a test print (FIG. 21C).

Thus, Example 6 shows that the distance the polymerization liquid must flow through the cure-zone to reach the center of the part is an important variable for surface roughness and, further, that continuous methods of the disclosure provide objects that advantageously have isotropic properties, regardless of print orientation.

Example 7: Surface Ridging

The surface ridging (roughness) of objects printed using the methods and apparatus of the disclosure was characterized. An array of 80 type IV dog-bone structures of various thicknesses (1 to 3 mm) and widths (1 to 6 mm) within the necks of the bones at a vertical print rate of 120 μm/s. The surfaces were characterized via optical microscopy and profilometry to quantify the magnitude of the profiles and the arithmetic surface roughness for each geometry. The maximum roughness, from peak to valley, was determined to be within ±100 μm (i.e., a ±1 optical pixel) for all samples (FIG. 21D and FIGS. 19A-19D), with substantially smoother surfaces for parts with a minimal dimension not exceeding 1.5 mm (within ±10 μm). The arithmetic surface roughness strongly correlated with the minimum part dimension (i.e., width or thickness FIG. 21E) with a Pearson correlation coefficient of r=0.90 for a 95% CI. Additionally, a series of dog-bone structures (80 dog bones, five unique geometries in replicate, 120 μm/s vertical print rate) similar to the type IV dog bone in profile, but with various thicknesses ranging from 1 to 3 mm). Although differing geometries can give rise to slight variations in tensile properties, the bulk material properties were relatively invariant (FIG. 21F). f7-f Thus, Example 7 demonstrates that for parts printed according to the methods of the disclosure on the apparatus of the disclosure, the surface ridging depends on the minimal wall thickness of the object being printed with thinner part sections having faster resin replenishment rates and consequently a smoother surface. This surface roughness is different from the discrete lamination layers in parts produced by traditional SLA and is independent of the vertical resolution of the slice patterns being sent to the light-patterning engines.

Example 8: Mobile Dewetting Material

The dewetting material of the disclosure can be (a) dewetting relative to the polymerization liquid and (b) flowed across the mobile phase. Advantageously, when such a dewetting material is provided, the print quality of the resulting print is significantly improved relative to a system wherein the dewetting properties of the dewetting material are subpar and behave as a wetting liquid and wherein the dewetting material is stationary.

Two dog-bone type prints were prepared. The first, using the methods and apparatus of the disclosure, the dewetting phase comprising a fluorinated oil that is dewetting relative to the polymerization liquid, the hard urethane acrylate resin. This print was also done using a flowing dewetting phase that is continuously recirculated during the print. The second dog-bone was prepared using glycerin as the dewetting phase, which does not have sufficient dewetting properties relative to the hard urethane acrylate polymerization liquid. Additionally, the glycerin was provided as a stationary pool. Both prints were prepared using a monochromatic UV source (100 μm optical resolution) and a TPO initiator. As shown in FIG. 17, the dog-bone printed according to the disclosure was a continuous, smooth object with well-defined edges. In contrast, the dog-bone printed using a stationary pool of glycerin as the dewetting, immiscible, layer was observed to be flaky and have hollow portions.

Thus, Example 8 demonstrates the advantages of the methods and apparatus of the disclosure arising from providing the immiscible layer as a dewetting layer and flowing the dewetting layer across the member.

The foregoing description is given for clearness of understanding only, and no unnecessary limitations should be understood therefrom as modifications within the scope of the disclosure may be apparent to those having ordinary skill in the art.

All patents, publications, and references cited herein are hereby fully incorporated by reference. In the case of conflict between the present disclosure and incorporated patents, publications, and references the present disclosure should control.

What is claimed:

1. A method of forming a three-dimensional object using an apparatus having a movable adhesion stage separate from a member, the method comprising:
    flowing a dewetting material across the member, the dewetting material having a build surface;
    providing a polymerization liquid on the dewetting material, wherein the polymerization liquid is immiscible with the dewetting material such that an interface is defined between the polymerization liquid and the dewetting material and a build region is defined between the interface and the adhesion stage; and
    exposing the polymerization liquid in the build region to a pattern of energy through at least a portion of the member and the dewetting material to polymerize the polymerization liquid and form a green polymer;
and advancing the adhesion stage away from the build surface to form the three-dimensional object comprised of the green polymer,
wherein
    the dewetting material is flowed across the member and is recirculated under conditions sufficient to dissipate heat and maintain a slip boundary between the green polymer and the dewetting material.

2. The method of claim 1, wherein the dewetting material is flowed across the member under laminar flow conditions.

3. The method of claim 1, wherein the dewetting material has a directionally uniform velocity profile across the build region during the formation of the three-dimensional object.

4. The method of claim 1, wherein the conditions sufficient to provide a slip boundary between the green polymer and the dewetting material comprises selecting the dewetting material and the polymerization liquid such that the dewetting material (D) and the polymerization liquid (PL) have a spreading coefficient, $S_pLvo$, of less than 1 or a negative value.

5. The method of claim 1, wherein the conditions sufficient to provide a slip boundary between the green polymer and the dewetting material comprises selecting the dewetting material and the polymerization liquid such that a volumetric flux of the dewetting material near or at an interface with the green polymer is greater than zero.

6. The method of claim 5, wherein the volumetric flux is in a range of about 0.05 mm/s to about 10 mm/sec.

7. The method of claim 1, wherein the conditions sufficient to provide a slip boundary between the green polymer and the dewetting material comprises selecting the dewetting material and the polymerization liquid such that a print quality of the three-dimensional object is improved relative to the print quality of a three-dimensional object prepared from an identical system except the dewetting material is stationary.

8. The method of claim 1, wherein the conditions sufficient to provide a slip boundary between the green polymer and the dewetting material comprises selecting the dewetting material and the polymerization liquid such that a print quality of the three-dimensional object is improved relative to the print quality of a three-dimensional object prepared from an identical system except (a) the dewetting material is not dewetting relative to the polymerization liquid, or (b) the dewetting material is not dewetting relative to the polymerization liquid and the dewetting material is stationary.

9. The method of claim 1, wherein the method is performed in an oxygen-free environment.

10. The method of claim 1, wherein the dewetting material comprises an aqueous liquid, organic liquid, silicone liquid, or fluoro liquid.

11. The method of claim 1, wherein the polymerization liquid comprises a particulate or colloidal matter capable of binding together.

12. The method of claim 1, wherein the polymerization liquid comprises an oxygen-sensitive polymerization liquid.

13. The method of claim 1, wherein a temperature of the dewetting material, the polymerization liquid, green polymer, or a combination thereof does not exceed 150° C.

14. The method of claim 1 having a vertical print speed in a range of about 10 μm/s to about 300 μm/s.

15. The method of claim 1, wherein the polymerization is performed by electromagnetic irradiation, electricity, thermal activation, magnetic activation, or a combination thereof.

16. The method of claim 1, wherein advancing the adhesion stage away from the build surface comprises advancing the adhesion stage away from the build surface at a constant rate for a fixed distance and is then paused for a fixed amount of time, and optionally repeated.

17. The method of claim 1, wherein advancing the adhesion stage away from the build surface comprises advancing the adhesion stage away from the build surface at a variable rate for a fixed distance and is then paused for a fixed amount of time, and optionally repeated.

18. The method of claim 1, wherein advancing the adhesion stage away from the build surface comprises advancing the adhesion stage away from the build surface in a reciprocating manner.

* * * * *

UNITED STATES PATENT AND TRADEMARK OFFICE
CERTIFICATE OF CORRECTION

PATENT NO. : 12,214,546 B2
APPLICATION NO. : 17/436754
DATED : February 4, 2025
INVENTOR(S) : David A. Walker et al.

Page 1 of 1

It is certified that error appears in the above-identified patent and that said Letters Patent is hereby corrected as shown below:

In the Claims

At Column 51, Line 6, "$S_PLvo$," should be -- $S_{PL/D}$, --.

Signed and Sealed this
Twenty-seventh Day of May, 2025

Coke Morgan Stewart
*Acting Director of the United States Patent and Trademark Office*